US012246850B2

(12) United States Patent
Ogawa et al.

(10) Patent No.: US 12,246,850 B2
(45) Date of Patent: Mar. 11, 2025

(54) AIRCRAFT VIBRATION DETECTING DEVICE, AIRCRAFT VIBRATION DETECTING METHOD, AND NON-TRANSITORY COMPUTER-READABLE STORAGE MEDIUM STORING THEREON PROGRAM FOR AIRCRAFT VIBRATION DETECTION

(71) Applicant: NABTESCO CORPORATION, Tokyo (JP)

(72) Inventors: Takashi Ogawa, Tokyo (JP); Takashi Tanimoto, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 216 days.

(21) Appl. No.: 17/188,596

(22) Filed: Mar. 1, 2021

(65) Prior Publication Data
US 2021/0269171 A1    Sep. 2, 2021

(30) Foreign Application Priority Data

Mar. 2, 2020 (JP) ................................. 2020-034895
Feb. 24, 2021 (JP) ................................. 2021-027714

(51) Int. Cl.
B64D 45/00 (2006.01)

(52) U.S. Cl.
CPC .. B64D 45/0005 (2013.01); *B64D 2045/0085* (2013.01)

(58) Field of Classification Search
None
See application file for complete search history.

(56) References Cited

U.S. PATENT DOCUMENTS

| 5,935,177 A | 8/1999 | Cox et al. |
| 8,234,037 B2 | 7/2012 | Goupil et al. |
| 9,535,419 B2 * | 1/2017 | Gojny ................ G05B 23/0254 |
| 2009/0048689 A1 * | 2/2009 | Pelton ................ B64D 45/0005 |
| | | 701/1 |

(Continued)

FOREIGN PATENT DOCUMENTS

JP    2017-77882 A    4/2017

OTHER PUBLICATIONS

Extended European Search Report dated Jul. 8, 2021, issued in corresponding EP Application No. 21159262.1 (9 pgs.).

(Continued)

*Primary Examiner* — Hitesh Patel
*Assistant Examiner* — Wenyuan Yang
(74) *Attorney, Agent, or Firm* — Pillsbury Winthrop Shaw Pittman, LLP

(57) ABSTRACT

An aircraft vibration detecting device applicable to an aircraft having a moving surface to be driven by an actuator includes a difference calculating unit for calculating a difference between a target value of an angle of the moving surface and an actual measured value of the angle of the moving surface, a threshold value determining unit for determining whether an absolute value of the difference is equal to or greater than a threshold value, and a vibration determining unit for determining that the moving surface is vibrating if the absolute value of the difference is equal to or greater than the threshold value.

4 Claims, 7 Drawing Sheets

(56) References Cited

U.S. PATENT DOCUMENTS

| | | | |
|---|---|---|---|
| 2009/0306829 A1* | 12/2009 | Hildebrand | B64C 11/008 700/279 |
| 2009/0326739 A1* | 12/2009 | Goupil | G05B 23/0235 318/565 |
| 2010/0152925 A1* | 6/2010 | Goupil | B64C 13/50 701/3 |
| 2013/0325254 A1* | 12/2013 | Goupil | G05B 23/0254 701/33.9 |
| 2017/0075350 A1 | 3/2017 | Wilson et al. | |

OTHER PUBLICATIONS

Office Action dated Dec. 10, 2024, issued in corresponding Japanese Patent Application No. 2021-027714 with English translation (7 pgs.).

Office Action dated Jul. 9, 2024, issued in corresponding Japanese Patent Application No. 2021-027714 with English language machine translation (8 pgs.).

* cited by examiner

AIRCRAFT VIBRATION DETECTING DEVICE, AIRCRAFT VIBRATION DETECTING METHOD, AND NON-TRANSITORY COMPUTER-READABLE STORAGE MEDIUM STORING THEREON PROGRAM FOR AIRCRAFT VIBRATION DETECTION

CROSS-REFERENCE TO RELATED APPLICATIONS

This application is based on and claims the benefit of priority from Japanese Patent Application Serial No. 2020-034895 (filed on Mar. 2, 2020) and Japanese Patent Application Serial No. 2021-027714 (filed on Feb. 24, 2021), the contents of which are hereby incorporated by reference in its entirety.

TECHNICAL FIELD

The present invention relates to an aircraft vibration detecting device, an aircraft vibration detecting method, and a non-transitory computer-readable storage medium storing thereon program for aircraft vibration detection.

BACKGROUND

Japanese Laid-Open Patent Publication No. 2017-077882 ("the '882 Publication") discloses an aircraft having a main wing with a moving surface, specifically a spoiler, being mounted thereon. The spoiler is driven by an actuator. The actuator is controlled by a controller. The controller outputs a control signal to the actuator in response to a signal from a higher level generated by, for example, manipulation of the yoke made by a pilot.

When the technology disclosed in the '882 Publication is employed, the controller may output an inappropriate control signal to the actuator due to faults in the circuit of the controller or other factors. In this case, while the higher level instructs the controller to keep the angle of the moving surface at a constant target value, the actual angle of the moving surface may alternately and repeatedly exceed or fall below the target value. In other words, the moving surface may vibrate. The moving surface may also result in vibrating for other reasons than the faults in the circuit of the controller. If the target value of the angle of the moving surface may be set at an inappropriate value, attempts may be made to control the actuator such that the difference between the inappropriate target value and the actual angle of the moving surface is compensated for. From the perspective of more reliable control of the moving surface, the vibration of the moving surface caused by these reasons can be preferably detected.

SUMMARY

The present invention addresses such a drawback, and one object thereof is to detect vibration of the moving surface.

To address the above drawback, an aircraft vibration detecting device applicable to an aircraft having a moving surface to be driven by an actuator includes a difference calculating unit for calculating a difference between a target value of an angle of the moving surface and an actual measured value of the angle of the moving surface, a threshold value determining unit for determining whether an absolute value of the difference is equal to or greater than a threshold value, and a vibration determining unit for determining that the moving surface is vibrating if the absolute value of the difference is equal to or greater than the threshold value.

When the moving surface is vibrating, the actual measured value of the angle of the moving surface repeatedly exceeds and falls below the target value. For this reason, if the difference exceeds the threshold value, the moving surface is highly likely to be vibrating. Therefore, if the absolute value of the difference is compared against the threshold value as described above, it can be detected whether the moving surface is vibrating.

The aircraft vibration detecting device may further include a number of times calculating unit for calculating the number of times the absolute value of the difference exceeds the threshold value.

In the aircraft vibration detecting device, the vibration determining unit may determine that the moving surface is vibrating if the absolute value of the difference exceeds the threshold value a specified number of times.

The aircraft vibration detecting device may further include an elapsed time determining unit for measuring a time that elapses after the absolute value of the difference exceeds the threshold value.

In the aircraft vibration detecting device, the vibration determining unit may determine that the moving surface is vibrating if the absolute value of the difference exceeds the threshold value the specified number of times within a determination period that starts when the absolute value of the difference exceeds the threshold value.

In the aircraft vibration detecting device, the vibration determining unit may determine that the vibration of the moving surface has settled if the absolute value of the difference exceeds the threshold value less than the specified number of times within the determination period.

The aircraft vibration detecting device may further include a stop signal outputting unit for outputting a stop signal for preventing the actuator from driving the moving surface when the moving surface is determined to be vibrating.

The aircraft vibration detecting device may further include a piloting operation determining unit for determining whether a temporal change of the target value is caused by manipulation of a yoke of the aircraft, and the vibration determining unit may not determine that the moving surface is vibrating if the temporal change of the target value is caused by manipulation of the yoke.

To address the above drawback, an aircraft vibration detecting method applicable to an aircraft having a moving surface to be driven by an actuator includes calculating a difference between a target value of an angle of the moving surface and an actual measured value of the angle of the moving surface, determining whether an absolute value of the difference is equal to or greater than a threshold value, and determining that the moving surface is vibrating if the absolute value of the difference is equal to or greater than the threshold value.

When the moving surface is vibrating, the actual measured value of the angle of the moving surface repeatedly exceeds and falls below the target value. For this reason, if the difference exceeds the threshold value, the moving surface is highly likely to be vibrating. Therefore, if the absolute value of the difference is compared against the threshold value as described above, it can be detected whether the moving surface is vibrating.

To address the above drawback, a program for aircraft vibration detection applicable to an aircraft having a moving surface to be driven by an actuator causes a computer to perform the steps of calculating a difference between a target value of an angle of the moving surface and an actual measured value of the angle of the moving surface, determining whether an absolute value of the difference is equal to or greater than a threshold value, and determining that the moving surface is vibrating if the absolute value of the difference is equal to or greater than the threshold value. The program may be stored on a non-transitory computer-readable storage medium.

When the moving surface is vibrating, the actual measured value of the angle of the moving surface repeatedly exceeds and falls below the target value. For this reason, if the difference exceeds the threshold value, the moving surface is highly likely to be vibrating. Therefore, if the absolute value of the difference is compared against the threshold value as described above, it can be detected whether the moving surface is vibrating.

DESCRIPTION OF THE PREFERRED EMBODIMENTS

The following describes, with reference to the drawings, an embodiment of an aircraft vibration detecting device applied to an aircraft. The following description starts with outlining the configuration of a spoiler and an actuator.

Figure 1:
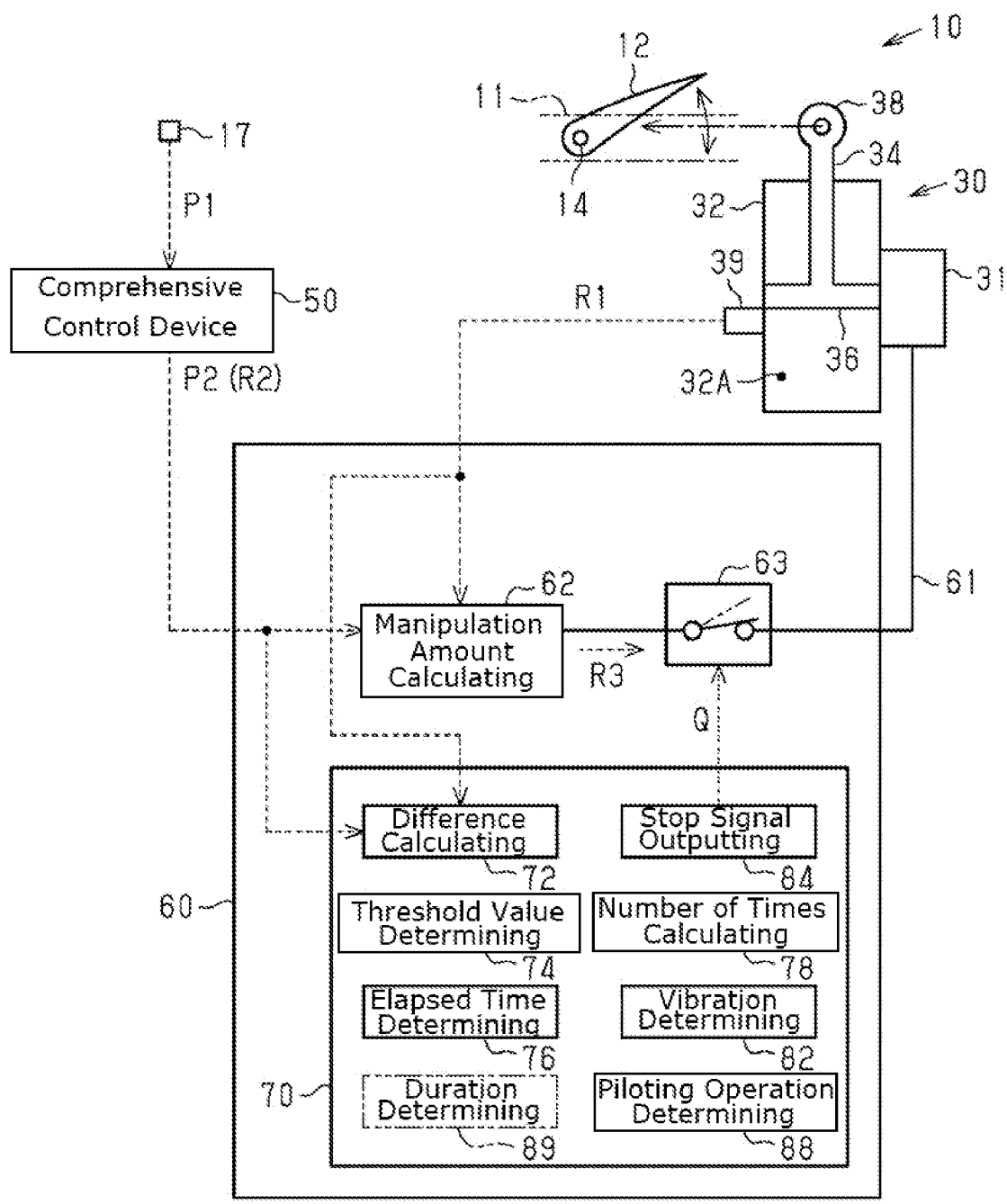
FIG. 1 schematically shows how to drive a spoiler.

As shown in FIG. 1, a spoiler 12, which is a moving surface, is attached to a main wing 11 of an aircraft 10. The spoiler 12 is positioned behind the middle of the main wing 11 in the front-and-back direction of the aircraft 10. It should be noted that there are a plurality of spoilers 12, but FIG. 1 shows only one of them. The spoilers 12 are lined next to each other in the left-and-right direction of the aircraft 10. The following describes any one of the spoilers 12.

The spoiler 12 is coupled to the main wing 11 via a rotation shaft 14. The spoiler 12 is rotatable relative to the main wing 11 on the rotation shaft 14. The spoiler 12 rotates between a retracted position that is substantially parallel to the main wing 11 and a tilted position that is tilted upward with respect to the main wing 11.

To the spoiler 12, an actuator 30 is attached for driving the spoiler 12 to operate. The actuator 30 is an electrohydraulic system. The actuator 30 has a tubular cylinder 32. The interior of the cylinder 32 constitutes a fluid chamber 32A into which and from which a hydraulic fluid is fed and discharged. In the fluid chamber 32A, a rod 34 having a columnar shape is positioned coaxially with the cylinder 32. The rod 34 has ends in the central axis direction, from one of which on a first side a piston 36 extends outwardly in the radial direction. The piston 36 divides the fluid chamber 32A into two sections. When the fluid chamber 32A applies a hydraulic pressure to the piston 36, the rod 34 resultantly reciprocates in the central axis direction thereof. A part of the rod 34 in the central axis direction on a second side opposite to the first side protrudes from the cylinder 32. The other end of the rod 34 in the central axis direction on the second side is a substantially annular attaching portion 38. The attaching portion 38 is attached to the spoiler 12.

To the cylinder 32, a position detector 39 is attached for detecting the position of the rod 34 relative to the cylinder 32. The position of the rod 34 is defined as a separation distance between a predetermined reference position and the first-side end of the rod 34 in the central axis direction. The predetermined reference position is the first-side end of the cylinder 32 in the central axis direction thereof. The position detector 39 is configured to detect an actually measured separation distance R1, which denotes the actually measured value of the separation distance.

On the outer surface of the cylinder 32, a manifold 31 is fixed that has a hydraulic circuit for the hydraulic fluid defined therein. The hydraulic circuit includes a hydraulic control valve or the like for switching the flow paths in the hydraulic circuit. The hydraulic fluid in the hydraulic circuit is fed into and discharged out of the cylinder 32.

Next, the control scheme of the actuator 30 is described.

The aircraft 10 has a comprehensive control device 50 installed therein for comprehensively controlling the operations of the units of the aircraft 10. The comprehensive control device 50 may be formed of one or more processors that perform various processes in accordance with computer programs (software). Alternatively, the comprehensive control device 50 may be formed of one or more dedicated hardware circuits such as application-specific integrated circuits (ASICs) that perform at least a part of the various processes, or it may be formed of circuitry including a combination of such circuits. The processors include a CPU and a memory, such as a RAM or ROM. The memory stores program codes or instructions configured to cause the CPU to perform processes. The memory, or a computer-readable storage medium, encompasses any kind of available media accessible via a general-purpose or dedicated computer.

The comprehensive control device 50 receives a manipulation amount P1 of a yoke 17 provided in the cockpit of the aircraft 10. The comprehensive control device 50 calculates a target value P2 of the angle of the spoiler 12 (hereinafter, referred to as the target angle) based on the manipulation amount P1 of the yoke 17, and outputs a signal related to the target angle P2.

The aircraft 10 has an actuator control device 60 installed therein for controlling the actuator 30. The actuator control device 60 may be formed of one or more processors that perform various processes in accordance with computer programs (software). The procedures performed by the actuator control device 60 or the processors include an aircraft vibration detecting method for detecting the vibration of the spoiler 12. The aircraft vibration detecting method includes a difference calculating procedure M1, a threshold value determining procedure M2, and a vibration determining procedure M5, each of which is one of the steps of a vibration detecting procedure W1, described below. The aircraft vibration detecting method preferably further includes at least one of an elapsed time determining procedure M3, a number of times calculating procedure M4, and a stop signal outputting procedure M6, each of which is also one of the steps of the vibration detecting procedure W1. Alternatively, the actuator control device 60 may be formed of one or more dedicated hardware circuits such as application-specific integrated circuits (ASICs) that perform at least a part of the various processes, or it may be formed of circuitry including a combination of such circuits. The processors include a CPU and a memory, such as a RAM or ROM. The memory stores program codes or instructions configured to cause the CPU to perform processes. The memory, or a computer-readable storage medium, encompasses any kind of available media accessible via a general-purpose or dedicated computer. The programs stored in the computer-readable storage medium include an aircraft vibration detecting program for detecting the vibration of the spoiler 12. The aircraft vibration detecting program causes a computer to perform the difference calculating procedure M1, the threshold value determining procedure M2, and the vibration determining procedure M5. The aircraft vibration detecting program preferably further causes the computer to perform at least one of the elapsed time determining procedure M3, the number of times calculating procedure M4, and the stop signal outputting procedure M6.

The actuator control device 60 receives a signal related to the actual measured separation distance R1 of the rod 34, which is detected by the position detector 39. The actuator control device 60 also receives the signal related to the target angle P2 of the spoiler 12, which is output from the comprehensive control device 50.

The actuator control device 60 includes a manipulation amount calculating unit 62 for calculating a manipulation amount R3 of the rod 34. The manipulation amount calculating unit 62 obtains the target angle P2 of the spoiler 12 and also converts the obtained target angle P2 into a target separation distance R2, which is a target value of the separation distance between the rod 34 and the reference position. In addition, the manipulation amount calculating unit 62 obtains the actual measured separation distance R1 of the rod 34 and also calculates a manipulation amount R3 of the rod 34 such that the calculated manipulation amount R3 can compensate for the difference between the actual measured separation distance R1 and the target separation distance R2. Specifically, the manipulation amount calculating unit 62 multiplies the difference between the actual measured separation distance R1 and the target separation distance R2 with a predetermined gain and offers the result of the multiplication as the manipulation amount R3 of the rod 34. The manipulation amount calculating unit 62 outputs a signal related to the manipulation amount R3 of the rod 34. Here, the signal related to the manipulation amount R3 of the rod 34 is substantially a result of converting the manipulation amount R3 of the rod 34 into an electrical signal for driving the hydraulic control valve of the manifold 31.

The circuit constituting the manipulation amount calculating unit 62 is connected to the hydraulic control valve of the manifold 31 via a communication line 61. The communication line 61 passes through an actuator connection switch 63 for switching whether the communication line 61 is connected or disconnected. While the actuator connection switch 63 keeps the connection, the signal related to the manipulation amount R3 of the rod 34 is input into the hydraulic control valve. While the actuator connection switch 63 maintains the disconnection, on the other hand, this signal is blocked from being input into the hydraulic control valve. The actuator 30 is configured to, when this signal is blocked from being input into the hydraulic control valve, operate to move the spoiler 12 back to the retracted position.

Here, as will be described in detail below, faults in the circuit of the manipulation amount calculating unit 62 may result in the manipulation amount calculating unit 62 calculating an inappropriate value as the manipulation amount R3 of the rod 34, which in turn causes the actual measured separation distance R1 of the rod 34 to alternately and repeatedly exceed and fall below the target separation distance R2. Similarly, faults in the circuit of the comprehensive control device 50 may result in the comprehensive control device 50 calculating an inappropriate value as the target angle P2 of the spoiler 12, which in turn causes the actual measured separation distance R1 of the rod 34 to alternately and repeatedly exceed and fall below the target separation distance R2. Due to these alternating and repeating changes, the actual angle of the spoiler 12 alternately and repeatedly exceeds and falls below the target angle P2, in other words, the spoiler 12 vibrates. Part of the actuator control device 60 serves as an aircraft vibration detecting device 70 for detecting this vibration of the spoiler 12.

Figure 5:
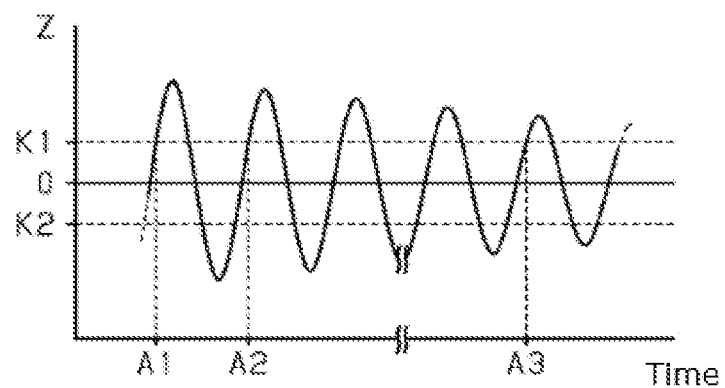
FIG. 5 is a time chart showing, as an example, how a difference varies over time.
Figure 7:
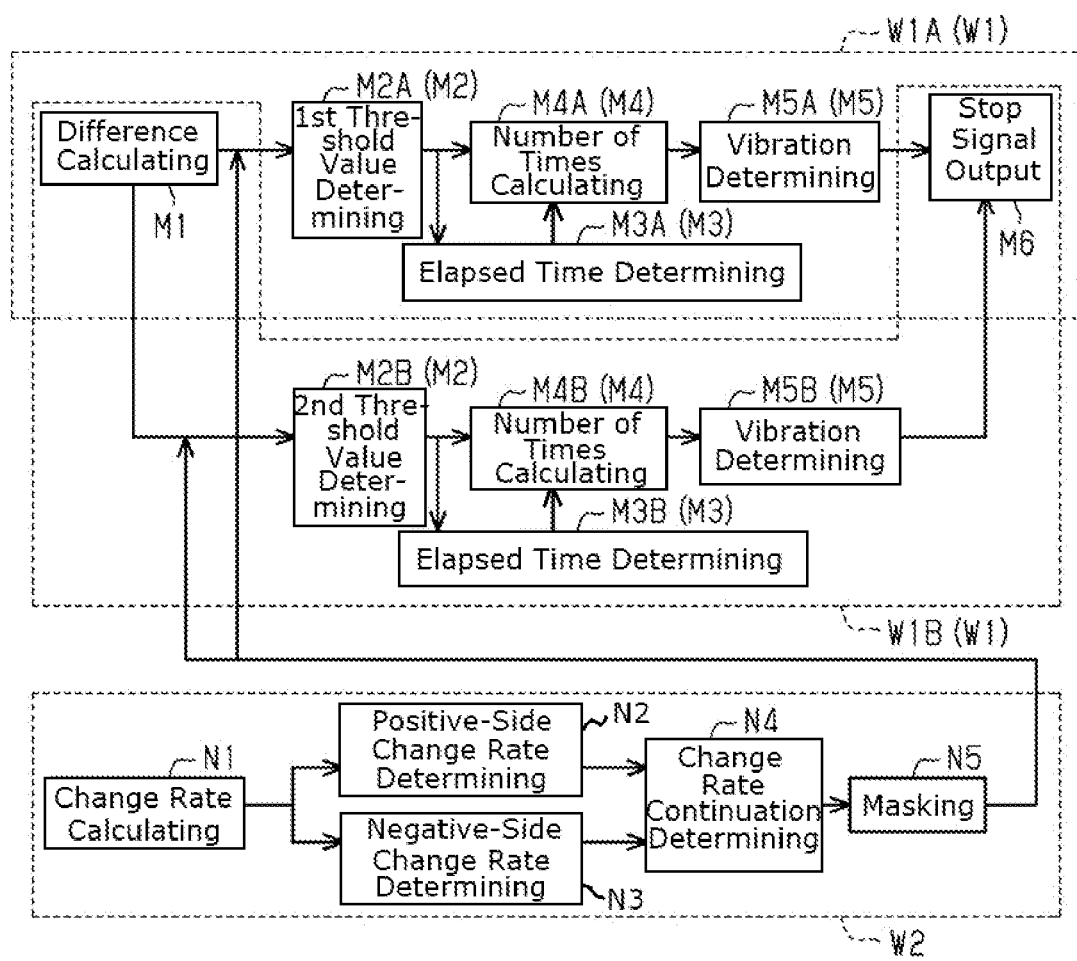
FIG. 7 is a block diagram generally showing a vibration detecting procedure and a piloting operation determining procedure.

The aircraft vibration detecting device 70 is capable of performing a vibration detecting procedure W1 for detecting the vibration of the spoiler 12. As shown in FIGS. 1 and 7, the aircraft vibration detecting device 70 includes a difference calculating unit 72 for performing the difference calculating procedure M1. The difference calculating unit 72 calculates the difference between the target angle P2 of the spoiler 12 and the actual measured value of the angle of the spoiler 12. In fact, the difference calculating unit 72 calculates a difference Z between the target separation distance R2 of the rod 34 and the actual measured separation distance R1 ($Z=R1-R2$). In other words, in the present embodiment, the difference calculating unit 72 treats the target separation distance R2 of the rod 34 as the target angle P2 of the spoiler 12 and treats the actual measured separation distance R1 of the rod 34 as the actual measured value of the angle of the spoiler 12. If the actual measured separation distance R1 alternately and repeatedly exceeds and falls below the target separation distance R2, the difference Z increases and decreases across zero, thereby showing a temporal change, as shown in FIG. 5. The vibration detecting procedure W1 includes two types of procedures, one of which is a positive-side vibration detecting procedure W1A for detecting the vibration of the spoiler 12 based on the temporal change characteristics exhibited by the difference Z while the difference Z is increasing and the other of which is a negative-side vibration detecting procedure W1B for detecting the vibration of the spoiler 12 based on the temporal change characteristics exhibited by the difference Z while the difference Z is decreasing. Here, when a time-varying value increases and decreases with respect to a reference value, it may be determined whether the amplitude is high or low. If the reference value itself changes, it becomes difficult to determine a threshold value used to determine whether the amplitude is high or low, such as a first threshold value K1 and a second threshold value K2, described below. The difference Z shows a temporal change across zero. In the case of such a time-varying value, the first and second threshold values K1 and K2 can be suitably determined uniquely for determining whether the amplitude is high or low.

Figure 8:
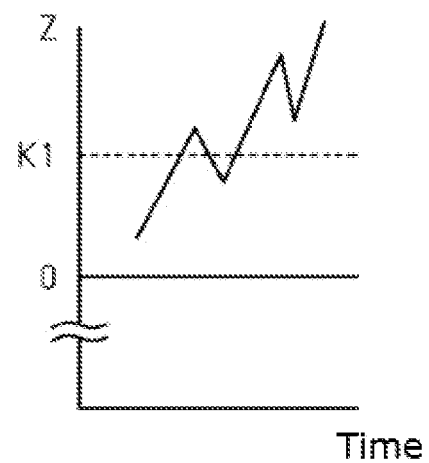
FIG. 8 shows an example case where a time-varying difference shows minute fluctuation.

The aircraft vibration detecting device 70 includes a threshold value determining unit 74 for performing the threshold value determining procedure M2. The threshold value determining unit 74 determines whether the difference Z is equal to or greater than a first threshold value K1 in a first threshold value determining procedure M2A, which is the threshold value determining procedure M2 of the positive-side vibration detecting procedure W1A. The threshold value determining unit 74 continuously obtains the difference Z and continuously performs this determining procedure. The first threshold value K1 is a positive value. As shown in FIG. 8, the difference Z may exceed and then fall below the first threshold value K1 due to noise or other factors. To address this issue, the threshold value determining unit 74 eliminates this fluctuation component when determining whether the difference Z becomes equal to or greater than the first threshold value K1. Stated differently, once the threshold value determining unit 74 determines that the difference Z is equal to or greater than the first threshold value K1, the threshold value determining unit 74 does not determine whether the difference Z is equal to or greater than the first threshold value K1 until the time-varying difference Z decreases to become equal to or less than zero. After determining that the difference Z is equal to or greater than the first threshold value K1, the threshold value determining unit 74 resumes determining whether the difference Z is equal to or greater than the first threshold value K1 if the difference Z decreases to become equal to or less than zero.

As shown in FIGS. 1 and 7, the threshold value determining unit 74 determines whether the difference Z is equal to or less than a second threshold value K2 in a second threshold value determining procedure M2B, which is the threshold value determining procedure M2 of the negative-side vibration detecting procedure W1B. The threshold value determining unit 74 continuously obtains the difference Z and continuously performs this determining procedure. The second threshold value K2 is a negative value having the same absolute value as the first threshold value K1. Once the threshold value determining unit 74 determines that the difference Z is equal to or less than the second threshold value K2, the threshold value determining unit 74 does not determine whether the difference Z is equal to or less than the second threshold value K2 until the time-varying difference Z increases to become equal to or greater than zero. After determining that the difference Z is equal to or less than the second threshold value K2, the threshold value determining unit 74 resumes determining whether the difference Z is equal to or less than the second threshold value K2 if the difference Z increases to become equal to or greater than zero.

The threshold value determining unit 74 stores therein the first and second threshold values K1 and K2 in advance. The first threshold value K1 is, for example, determined through experiments and simulations and equal to the minimum value of the amplitude of the temporal change shown by the difference Z when faults occur in the circuits of the manipulation amount calculating unit 62 and the comprehensive control device 50. The first threshold value K1 corresponds to, for example, an angle of one degree formed by the spoiler 12. Note that the term "amplitude" denotes half the difference between the top peak where the time-varying difference Z starts to decrease after increasing and the bottom peak where the difference Z starts to increase after decreasing.

The aircraft vibration detecting device 70 includes an elapsed time determining unit 76 for performing the elapsed time determining procedure M3. The elapsed time determining unit 76 measures, in an elapsed time determining procedure M3A of the positive-side vibration detecting procedure W1A, the time that elapses after the difference Z has increased to reach the first threshold value K1. Specifically, the elapsed time determining unit 76 measures a first elapsed time TS1 starting when the difference Z increases to reach the first threshold value K1 and ending when the difference Z increases to reach the first threshold value K1 the next time. The elapsed time determining unit 76 then determines whether the first elapsed time TS1 falls within a specified elapsed time range SD. In relation to a condition that the difference Z must decrease to become equal to or less than zero within the period of time from when the difference Z is determined to be equal to or greater than the first threshold value K1 to when the difference Z is determined, the next time, to be equal to or greater than the first threshold value K1, the elapsed time determining unit 76 determines whether the first elapsed time TS1 falls within the specified elapsed time range SD provided that the difference Z becomes equal to or less than zero within the period of time from when the difference Z increases to reach the first threshold value K1 to when the difference Z increases to reach the first threshold value K1 the next time.

In addition, the elapsed time determining unit 76 measures, in an elapsed time determining procedure M3B of the negative-side vibration detecting procedure W1B, the time that elapses after the difference Z has decreased to reach the second threshold value K2. Specifically, the elapsed time determining unit 76 measures a second elapsed time TS2 starting when the difference Z decreases to reach the second threshold value K2 and ending when the difference Z decreases to reach the second threshold value K2 the next time. The elapsed time determining unit 76 then determines whether the second elapsed time TS2 falls within the specified elapsed time range SD. In relation to a condition that the difference Z must increase to become equal to or greater than zero within the period of time from when the difference Z is determined to be equal to or less than the second threshold value K2 to when the difference Z is determined, the next time, to be equal to or less than the second threshold value K2, the elapsed time determining unit 76 determines whether the second elapsed time TS2 falls within the specified elapsed time range SD provided that the difference Z becomes equal to or greater than zero within the period of time from when the difference Z decreases to reach the second threshold value K2 to when the difference Z decreases to reach the second threshold value K2 the next time.

The elapsed time determining unit 76 stores therein the specified elapsed time range SD in advance, which specifies the range from the allowable shortest elapsed time to the allowable longest elapsed time. The lower limit of the specified elapsed time range SD is, for example, determined through experiments and simulations and equal to the minimum value of the cycle of the temporal change shown by the difference Z when faults occur in the circuits of the manipulation amount calculating unit 62 and the comprehensive control device 50. The lower limit of the specified elapsed time range SD is, for example, 0.01 seconds. The upper limit of the specified elapsed time range SD is, for example, determined through experiments and simulations and equal to the maximum value of the cycle of the temporal change shown by the difference Z when faults occur in the circuits of the manipulation amount calculating unit 62 and the comprehensive control device 50. The upper limit of the specified elapsed time range SD is, for example, 0.05 seconds. Here, the term "cycle" denotes the time interval between adjacent top peaks of the temporal change shown by the difference Z.

The aircraft vibration detecting device 70 includes a number of times calculating unit 78 for performing the number of times calculating procedure M4. The number of times calculating unit 78 calculates, in a number of times calculating procedure M4A of the positive-side vibration detecting procedure W1A, a first number of times C1 the difference Z is determined to have increased to reach the first threshold value K1 while the condition that the first elapsed time TS1 falls within the specified elapsed time range SD is continuously satisfied. Here, the first number of times C1 is the number of times the difference Z is determined to have increased to reach the first threshold value K1 after having decreased to become equal to or less than zero. Similarly, the number of times calculating unit 78 calculates, in a number of times calculating procedure M4B of the negative-side vibration detecting procedure W1B, a second number of times C2 the difference Z is determined to have decreased to reach the second threshold value K2 while the condition that the second elapsed time TS2 falls within the specified elapsed time range SD is continuously satisfied. Here, the second number of times C2 is the number of times the difference Z is determined to decrease to reach the second threshold value K2 after having increased to become equal to or greater than zero.

The aircraft vibration detecting device 70 includes a vibration determining unit 82 for performing the vibration determining procedure M5. The vibration determining unit 82 determines whether the spoiler 12 is vibrating. The vibration determining unit 82 determines, in a vibration determining procedure M5A of the positive-side vibration detecting procedure W1A, that the spoiler 12 is vibrating provided that the first number of times C1 is equal to or greater than a specified number of times CD. As described above, the first number of times C1 is calculated provided that the first elapsed time TS1 falls within the specified elapsed time range SD. Accordingly, the vibration determining unit 82 determines that the spoiler 12 is vibrating if one or more conditions are satisfied, and one of the conditions is that the first elapsed time TS1 falls within the specified elapsed time range SD. In addition, since the first number of times C1 denotes the number of times the difference Z is determined to have increased to reach the first threshold value K1, the vibration determining unit 82 determines that the spoiler 12 is vibrating if one or more conditions are satisfied, and one of the conditions is that the difference Z has increased to reach or exceed the first threshold value K1.

As described above, the vibration determining unit 82 determines that the spoiler 12 is vibrating if the first number of times C1 is equal to or greater than the specified number of times CD. If this is stated differently in light of the definition of the first number of times C1, the vibration determining unit 82 determines that the spoiler 12 is vibrating when the number of times the difference Z increases to reach the first threshold value K1 becomes equal to or greater than the specified number of times CD within a determination period J that starts when the difference Z increases to reach the first threshold value K1. Here, the number of increases made by the difference Z includes the increase that triggers the start of the determination period J. The determination period J lasts for a length of time equal to the result of multiplying the upper limit of the specified elapsed time range SD with the specified number of time CD. In other words, the determination period J is determined in advance. As mentioned earlier, the elapsed time determining unit 76 measures the first elapsed time TS1 every time the difference Z increases to reach the first threshold value K1. This means that the elapsed time determining unit 76 indirectly measures the entire time that elapses after the difference Z increases to reach the first threshold value K1 until the determination period J ends. The vibration determining unit 82 consults this elapsed time when determining whether the spoiler 12 is vibrating.

The vibration determining unit 82 determines, in a vibration determining procedure M5B of the negative-side vibration detecting procedure W1B, that the spoiler 12 is vibrating provided that the second number of times C2 is equal to or greater than the specified number of times CD. Considering the definition of the manner of how to calculate the second number of times C2, the vibration determining unit 82 determines that the spoiler 12 is vibrating if one or more conditions are satisfied, and one of the conditions is that the second elapsed time TS2 falls within the specified elapsed time range SD. In addition, the vibration determining unit 82 determines that the spoiler 12 is vibrating if one or more conditions are satisfied, and one of the conditions is is that the difference Z has decreased to reach or fall below the second threshold value K2.

As described above, the vibration determining unit 82 determines that the spoiler 12 is vibrating if the second number of times C2 is equal to or greater than the specified number of times CD. If this is stated differently in light of the definition of the second number of times C2, the vibration determining unit 82 determines that the spoiler 12 is vibrating when the number of times the difference Z decreases to reach the second threshold value K2 becomes equal to or greater than the specified number of times CD within a determination period J that starts when the difference Z decreases to reach the second threshold value K2. Here, the number of decreases made by the difference Z includes the decrease that triggers the start of the determination period J. The determination period J has been described above. As mentioned earlier, the elapsed time determining unit 76 measures the second elapsed time TS2 every time the difference Z decreases to reach the second threshold value K2. This means that the elapsed time determining unit 76 indirectly measures the entire time that elapses after the difference Z decreases to reach the second threshold value K2 until the determination period J ends. The vibration determining unit 82 consults this elapsed time when determining whether the spoiler 12 is vibrating.

The vibration determining unit 82 stores therein the specified number of times CD in advance. The specified number of times CD is determined through experiments and simulations to certainly determine that the spoiler 12 is continuously vibrating due to the faults in the circuits of the manipulation amount calculating unit 62 and the comprehensive control device 50. The specified number of times CD is, for example, ten times.

The aircraft vibration detecting device 70 includes a stop signal outputting unit 84 for performing the stop signal outputting procedure M6. In the stop signal outputting procedure M6, the stop signal outputting unit 84 outputs a stop signal for stopping the actuator 30 from driving the spoiler 12, when it is determined that the spoiler 12 is vibrating. Specifically, the stop signal outputting unit 84 outputs to the actuator connection switch 63, as the stop signal, a disconnection signal Q for switching the actuator connection switch 63 into the disconnected state.

The aircraft vibration detecting device 70 includes a piloting operation determining unit 88 for performing a piloting operation determining procedure W2, which is carried out in parallel with the vibration detecting procedure W1. The spoiler 12 may be deliberately controlled to vibrate by manipulating the yoke 17 to change the target angle P2 of the spoiler 12. Such deliberately caused vibration of the spoiler 12 needs to be put aside from the detected occurrences of the vibration of the spoiler 12. The piloting operation determining unit 88 determines whether the temporal change of the target angle P2 is caused by the manipulation of the yoke 17. When determining that the temporal change of the target angle P2 is caused by the manipulation of the yoke 17, the piloting operation determining unit 88 turns on a prohibition flag F in order to prohibit itself from making a determination that the spoiler 12 is vibrating.

Specifically, the piloting operation determining unit 88 performs a change rate calculating procedure N1 for calculating a change rate of the target angle P2 per unit time (hereinafter, referred to as the target value change rate) ΔP2. In addition, the piloting operation determining unit 88 performs a positive-side change rate determining procedure N2 for determining whether a first condition is satisfied. The first condition is defined such that the target value change rate ΔP2 becomes equal to or greater than a first change rate L1 while the target angle P2 is increasing. In addition, the piloting operation determining unit 88 performs a negative-side change rate determining procedure N3 for determining whether a second condition is satisfied. The second condition is defined such that the target value change rate ΔP2 becomes equal to or less than a second change rate L2 while the target angle P2 is decreasing after having stopped increasing following the satisfaction of the first condition and starting to decrease. The second change rate L2 is a negative value having the same absolute value as the first change rate L1. Provided that the second condition is satisfied, the piloting operation determining unit 88 performs a change rate continuation determining procedure N4 of determining whether a third condition is satisfied. The third condition is defined such that a determination elapsed time TM from when the first condition is satisfied to when the first condition is satisfied the next time is equal to or less than a determination specified time TMD. The piloting operation determining unit 88 determines that the temporal change shown by the target angle P2 is caused by the manipulation of the yoke 17 while the third condition is continuously satisfied, during which the piloting operation determining unit 88 turns on a prohibition flag F for prohibiting an attempt to detect whether the spoiler 12 is vibrating. The procedure of turning on the prohibition flag F is referred to as a masking procedure N5. As will be described below, while the prohibition flag F is kept on, it is not determined whether the difference Z is equal to or greater than the first threshold value K1 and whether the difference Z is equal to or less than the second threshold value K2.

The piloting operation determining unit 88 stores therein the first and second change rates L2 and L2 in advance. The first change rate L1 is, for example, the minimum value of the target value change rate ΔP2 of the time-varying target angle P2 while the yoke 17 is being manipulated and determined through experiments and simulations as the minimum value of the target value change rate ΔP2 while the target angle P2 is increasing. The piloting operation determining unit 88 stores therein the determination specified time TMD in advance. The determination specified elapsed time TMD is equal to the upper limit of the specified elapsed time range SD.

The following now specifically describes the vibration detecting procedure W1 and the piloting operation determining procedure W2. The piloting operation determining procedure W2 turns on or off the prohibition flag F. The vibration detecting procedure W1 determines whether to permit the detection of the vibration of the spoiler 12 based on whether the prohibition flag F is on or off. Thus, the following first describes the piloting operation determining procedure W2 and next describes the vibration detecting procedure W1.

The piloting operation determining unit 88 is configured as described below to perform the piloting operation determining procedure W2. As will be described below, in the piloting operation determining procedure W2, the piloting operation determining unit 88 repeatedly obtains the target angle P2 of the spoiler 12 received from the comprehensive control device 50. The piloting operation determining unit 88 is configured to hold the current value of the target angle P2 obtained by itself and the last value of the target angle P2 obtained at the immediately preceding timing. The piloting operation determining unit 88 is also configured to obtain values of the target angle P2 at predetermined obtaining time intervals ΔT.

Figure 2:
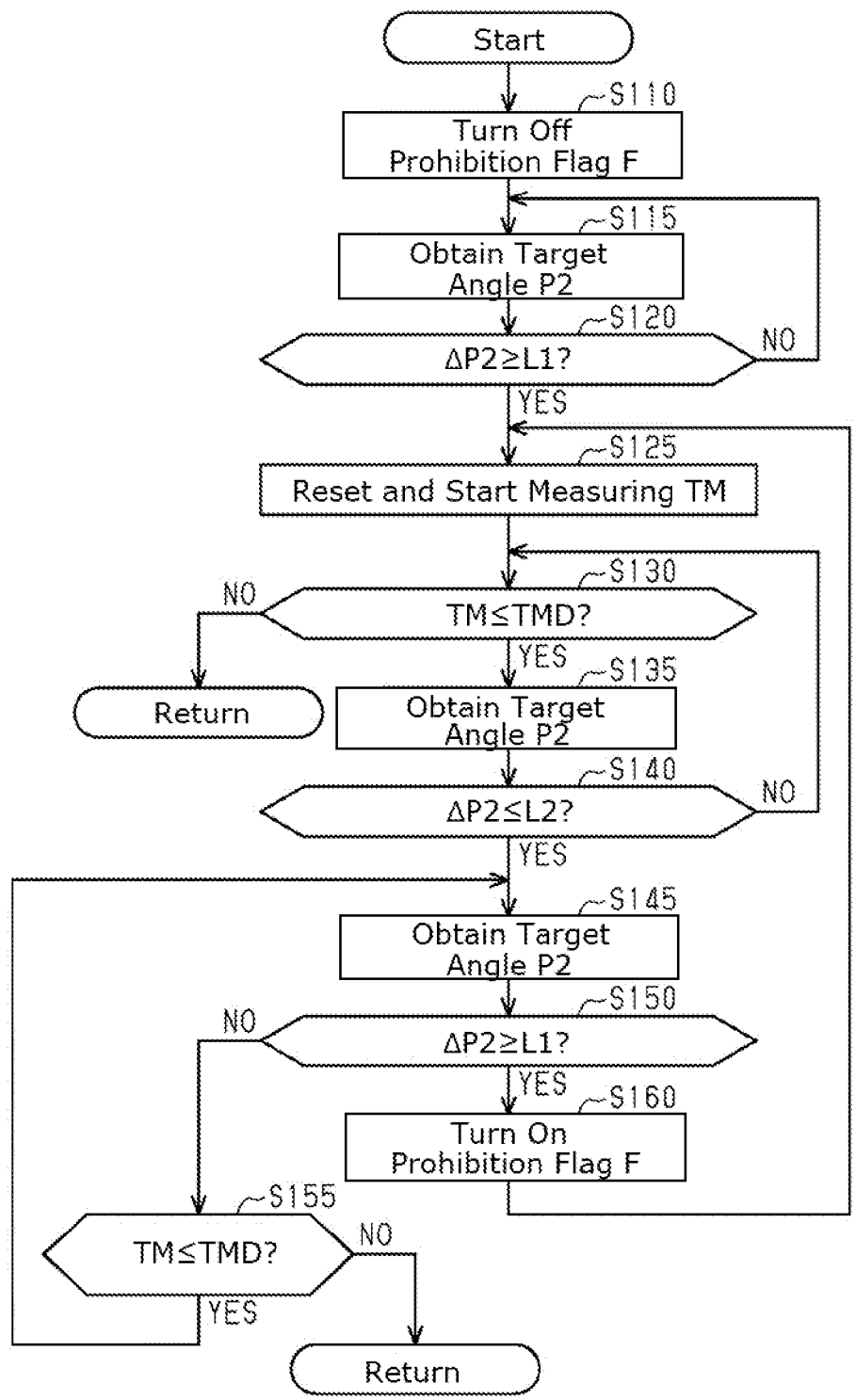
FIG. 2 is a flowchart showing steps of a piloting operation determining procedure.

As shown in FIG. 2, the piloting operation determining unit 88 performs a step S110 at the start of the piloting operation determining procedure W2. In the step S110, the piloting operation determining unit 88 turns off the prohibition flag F. Subsequently, the piloting operation determining unit 88 allows the procedure to proceed to a step S115.

In the step S115, the piloting operation determining unit 88 obtains a new value of the target angle P2 when the predetermined obtaining time interval ΔT has elapsed after obtaining the last value of the target angle P2. After obtaining the new value of the target angle P2, the piloting operation determining unit 88 allows the procedure to proceed to a step S120.

In the step S120, the piloting operation determining unit 88 determines whether the target value change rate ΔP2 is equal to or greater than the first change rate L1. Specifically, the piloting operation determining unit 88 calculates the target value change rate ΔP2 by subtracting, from the current value of the target angle P2 obtained in the step S115, the last value of the target angle P2 and dividing the result of the subtraction by the obtaining time interval ΔT. These series of calculations are referred to as the change rate calculating procedure N1. When the piloting operation determining procedure W2 is carried out for the first time after the aircraft 10 starts flying, the last value of the target angle P2 is set to zero. When the target value change rate ΔP2 is less than the first change rate L1 (step S120: NO), the piloting operation determining unit 88 performs the step S115 again. Until the target value change rate ΔP2 reaches the first change rate L1 or greater, the piloting operation determining unit 88 repeatedly performs the steps S115 and S120. Repeatedly performing these steps is equivalent to monitoring the time-varying target angle P2 and staying standby until the target value change rate ΔP2 reaches or exceeds the first change rate L1. Once the target value change rate ΔP2 reaches the first change rate L1 or greater (step S120: YES), the piloting operation determining unit 88 allows the procedure to proceed to the step S125. This means that the first condition mentioned above is satisfied. In other words, the step S120 is referred to as the positive-side change rate determining procedure N2 for determining whether the first condition is satisfied.

In the step S125, the piloting operation determining unit 88 resets the determination elapsed time TM and then starts measuring the determination elapsed time TM. Subsequently, the piloting operation determining unit 88 allows the procedure to proceed to a step S130.

In the step S130, the piloting operation determining unit 88 determines whether the determination elapsed time TM is equal to or less than the determination specified time TMD. If the determination elapsed time TM is equal to or less than the determination specified time TMD (step S130: YES), the piloting operation determining unit 88 allows the procedure to proceed to a step S135. In the step S135, the piloting operation determining unit 88 stays standby until the predetermined obtaining time interval ΔT has elapsed after obtaining the value of the target angle P2 the last time and then obtains a new value of the target angle P2. After obtaining the new value of the target angle P2, the piloting operation determining unit 88 allows the procedure to proceed to a step S140. In the step S140, the piloting operation determining unit 88 newly calculates the target value change rate ΔP2 in the same manner as in the step S120 and determines whether the calculated target value change rate ΔP2 is equal to or less than the second change rate L2. If the target value change rate ΔP2 is greater than the second change rate L2 (step S140: NO), the piloting operation determining unit 88 allows the procedure to go back to the step S130.

Until the determination elapsed time TM exceeds the determination specified time TMD, the piloting operation determining unit 88 repeatedly performs the steps S130, S135, and S140. If the determination elapsed time TM exceeds the determination specified time TMD (step S130: NO) before the target value change rate ΔP2 reaches the second change rate L2 or less (step S140: NO), the piloting operation determining unit 88 terminates the series of steps included in the piloting operation determining procedure W2. If such is the case, the piloting operation determining unit 88 performs the step S110 again.

On the other hand, if the target value change rate ΔP2 becomes equal to or less than the second change rate L2 in the step S140 (step S140: YES) before the determination elapsed time TM exceeds the determination specified time TMD, the piloting operation determining unit 88 allows the procedure to proceed to a step S145. This means that the second condition mentioned above is satisfied. In other words, the step S140 is referred to as the negative-side change rate determining procedure N3 for determining whether the second condition is satisfied.

In the step S145, the piloting operation determining unit 88 stays standby until the predetermined obtaining time interval ΔT has elapsed after obtaining the value of the target angle P2 the last time and then obtains a new value of the target angle P2. After obtaining the new value of the target angle P2, the piloting operation determining unit 88 allows the procedure to proceed to a step S150. In the step S150, the piloting operation determining unit 88 determines whether the target value change rate ΔP2 is equal to or greater than the first change rate L1 in the same manner as in the step S120. If the target value change rate ΔP2 is less than the first change rate L1 (step S150: NO), the piloting operation determining unit 88 allows the procedure to proceed to a step S155.

In the step S155, the piloting operation determining unit 88 determines whether the determination elapsed time TM is equal to or less than the determination specified time TMD. If the determination elapsed time TM is equal to or less than the determination specified time TMD (step S155: YES), the piloting operation determining unit 88 allows the procedure to go back to the step S145.

Until the determination elapsed time TM exceeds the determination specified time TMD, the piloting operation determining unit 88 repeatedly performs the steps S145, S150, and S155. If the determination elapsed time TM exceeds the determination specified time TMD (step S155: NO) before the target value change rate ΔP2 reaches the first change rate L1 or greater (step S150: NO), the piloting operation determining unit 88 terminates the series of steps included in the piloting operation determining procedure W2. If such is the case, the piloting operation determining unit 88 performs the step S110 again.

On the other hand, if the target value change rate ΔP2 becomes equal to or greater than the first change rate L1 in the step S150 (step S150: YES) before the determination elapsed time TM exceeds the determination specified time TMD, the piloting operation determining unit 88 allows the procedure to proceed to a step S160. This means that a third condition is satisfied. The steps S115 to S155 are referred to as the change rate continuation determining procedure N4 for determining whether the third condition is satisfied.

In the step S160, the piloting operation determining unit 88 determines that the temporal change of the target angle P2 is caused by the manipulation of the yoke 17 and turns on the prohibition flag F. This step is referred to as a masking procedure N5. The piloting operation determining unit 88 allows the procedure to go back to the step S125. After this, the piloting operation determining unit 88 repeatedly performs the step S125 and the subsequent steps. In the subsequent steps, the prohibition flag F is kept on as long as the third condition is continuously satisfied. If the third condition is no longer satisfied, the prohibition flag F is turned off.

The following now describes the steps of the vibration detecting procedure W1. As mentioned above, the vibration detecting procedure W1 includes two types of procedures: the positive-side vibration detecting procedure W1A; and the negative-side vibration detecting procedure W1B. The positive-side and negative-side vibration detecting procedures W1A and W1B are carried out in parallel. If one of the positive-side and negative-side vibration detecting procedures W1A and W1B detects that the spoiler 12 is vibrating, the other is terminated.

The aircraft vibration detecting device 70 is configured as described below to carry out the positive-side and negative-side vibration detecting procedures W1A and W1B. As will be described below, the difference calculating unit 72 repeatedly calculates the difference Z between the actual measured separation distance R1 of the rod 34 and the target separation distance R2 in the positive-side and negative-side vibration detecting procedures W1A and W1B. The difference calculating unit 72 is configured to hold therein a current value of the difference Z calculated by itself and the last value of the difference Z calculated at the immediately preceding timing. The difference calculating unit 72 is configured to calculate the difference Z at predetermined calculating time intervals.

Figure 3:
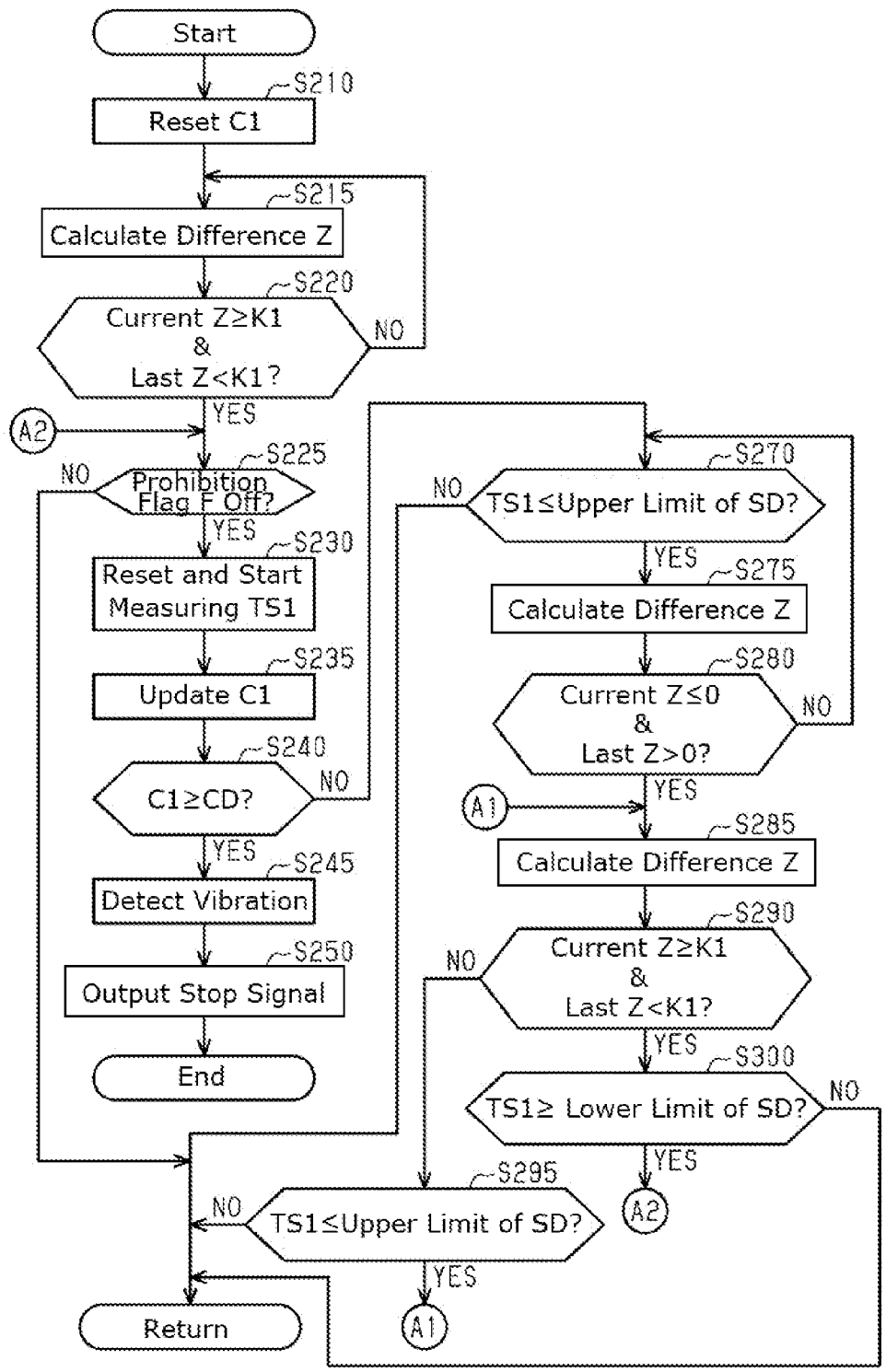
FIG. 3 is a flowchart showing steps of a positive-side vibration detecting procedure.

The following now describes the steps of the positive-side vibration detecting procedure W1A. As shown in FIG. 3, to begin with, the number of times calculating unit 78 performs the step S210. In the step S210, the number of times calculating unit 78 resets the first number of times C1 to zero. Subsequently, the number of times calculating unit 78 allows the procedure to proceed to a step S215. The step S210 is referred to as the number of times calculating procedure M4A.

In the step S215, the difference calculating unit 72 stays standby until the predetermined calculating time interval has elapsed after calculating the difference Z the last time and then calculates the difference Z between the actual measured separation distance R1 of the rod 34 and the target separation distance R2. Specifically, the difference calculating unit 72 obtains the current value of the target angle P2 of the spoiler 12 received from the comprehensive control device 50 and also converts the obtained target angle P2 into the target separation distance R2 of the rod 34. In addition, the difference calculating unit 72 obtains a current value of the actual measured separation distance R1 received from the position detector 39. The difference calculating unit 72 then calculates the difference Z by subtracting the target separation distance R2 from the actual measured separation distance R1. Subsequently, the difference calculating unit 72 allows the procedure to proceed to a step S220. The step S215 is referred to as the difference calculating procedure M1.

In the step S220, the threshold value determining unit 74 determines whether the current value of the difference Z is equal to or greater than the first threshold value K1 and the last value of the difference Z is less than the first threshold value K1. If the last value of the difference Z is less than the first threshold value K1 and the current value of the difference Z is equal to or greater than the first threshold value K1, this means that the time-varying difference Z reaches the first threshold value K1 while increasing. In other words, the determination to be made in the step S220 is designed to detect whether the difference Z has increased to reach the first threshold value K1. To make this determination, the threshold value determining unit 74 first obtains the current and last values of the difference Z calculated by the difference calculating unit 72. The threshold value determining unit 74 compares the current value of the difference Z against the first threshold value K1 and also compares the last value of the difference Z against the first threshold value K1. The threshold value determining unit 74 allows the procedure to go back to the step S215, if at least one of (i) the condition that the current value of the difference Z is equal to or greater than the first threshold value K1 and (ii) the condition that the last value of the difference Z is less than the first threshold value K1 is not satisfied (step S220: NO). The threshold value determining unit 74 and the difference calculating unit 72 repeatedly perform the steps S215 and S220 until both of the condition that the current value of the difference Z is equal to or greater than the first threshold value K1 and the condition that the last value of the difference Z is less than the first threshold value K1 are satisfied. Repeatedly performing these steps is equivalent to monitoring the time-varying difference Z and staying standby until the difference Z increases to reach the first threshold value K1. If the current value of the difference Z is equal to or greater than the first threshold value K1 and the last value of the difference Z is less than the first threshold value K1 (step S220: YES), the threshold value determining unit 74 allows the procedure to proceed to a step S225. The step S220 is referred to as the first threshold value determining procedure M2A.

In the step S225, the number of times calculating unit 78 determines whether the prohibition flag F is off. If the prohibition flag F is on (step S225: NO), the number of times calculating unit 78 terminates the series of steps in the positive-side vibration detecting procedure W1A. If such is the case, the number of times calculating unit 78 performs the step S210 again. Stated differently, the first number of times C1 is reset. As noted, if the prohibition flag F is on, the vibration detecting apparatus 70 is prevented from determining that the spoiler 12 is vibrating. It should be noted that, as described above, the prohibition flag F is kept on while the target angle P2 of the spoiler 12 is varying in accordance with the manipulation of the yoke 17.

If the prohibition flag F is off in the step S225 (step S225: YES), on the other hand, the number of times calculating unit 78 allows the procedure to proceed to the step S230. In the step S230, the elapsed time determining unit 76 resets the first elapsed time TS1 and then starts measuring the first elapsed time TS1. Subsequently, the elapsed time determining unit 76 allows the procedure to proceed to a step S235.

In the step S235, the number of times calculating unit 78 updates the first number of times C1. Specifically, the number of times calculating unit 78 calculates a new value of the first number of times C1 by adding one to the current value of the first number of times C1. Subsequently, the number of times calculating unit 78 allows the procedure to proceed to a step S240. The step S235 is referred to as the number of times calculating procedure M4A.

In the step S240, the vibration determining unit 82 determines whether the first number of times C1 is equal to or greater than the specified number of times CD. If the first number of times C1 is equal to or greater than the specified number of times CD (step S240: YES), the vibration determining unit 82 allows the procedure to proceed to a step S245 and determines that the spoiler 12 is vibrating. In other words, the vibration determining unit 82 detects the vibration of the spoiler 12. The steps S240 and S245 are referred to as the vibration determining procedure M5A. Subsequently, the vibration determining unit 82 allows the procedure to proceed to a step S250. In the step S250, the stop signal outputting unit 84 outputs, as the stop signal, the disconnection signal Q to the actuator connection switch 63. As a result of this, the actuator connection switch 63 is switched to the disconnected state. After performing the step S250, the stop signal outputting unit 84 terminates the series of steps of the positive-side vibration detecting procedure W1A. This means that the procedure does not go back to the step S210. The step S250 is referred to as the stop signal outputting procedure M6.

On the other hand, if the first number of times C1 is less than the specified number of times CD in the step S240 (step S240: NO), the vibration determining unit 82 allows the procedure to proceed to a step S270. In the step S270, the elapsed time determining unit 76 determines whether the first elapsed time TS1 is equal to or less than the upper limit of the specified elapsed time range SD. If the first elapsed time TS1 is equal to or less than the upper limit of the specified elapsed time range SD (step S270: YES), the elapsed time determining unit 76 allows the procedure to proceed to a step S275.

In this case, in the step S275, the difference calculating unit 72 stays standby until the predetermined calculating time interval has elapsed after calculating the difference Z the last time and then newly calculates the difference Z. In other words, the difference calculating unit 72 calculates the difference Z in the same manner as in the step S215 and allows the procedure to proceed to a step S280. In the step S280, the threshold value determining unit 74 determines whether the current value of the difference Z is equal to or less than zero and the last value of the difference Z is greater than zero. If the last value of the difference Z is greater than zero and the current value of the difference Z is equal to or less than zero, this means that the time-varying difference Z reaches zero while decreasing. This determination is intended to make sure that the difference Z decreases to a value equal to or less than zero within a period from when the difference Z is determined to be equal to or greater than the first threshold value K1 to when the difference Z is determined to be equal to or greater than the first threshold value K1 the next time. If the determination made in the step S280 indicates NO, the threshold value determining unit 74 allows the procedure to go back to the step S270.

Until the first elapsed time TS1 exceeds the upper limit of the specified elapsed time range SD, the elapsed time determining unit 76, the difference calculating unit 72 and the threshold value determining unit 74 repeatedly perform the steps S270, S275, and S280. If the first elapsed time TS1 exceeds the upper limit of the specified elapsed time range SD (step S270: NO) before the difference Z decreases to reach zero (step S280: NO), the elapsed time determining unit 76 terminates the series of steps included in the positive-side vibration detecting procedure W1A. If such is the case, the number of times calculating unit 78 performs the step S210 again.

On the other hand, if the difference Z decreases to reach zero in the step S280 before the first elapsed time TS1 exceeds the upper limit of the specified elapsed time range SD (step S270: YES, step S280: YES), the threshold value determining unit 74 allows the procedure to proceed to a step S285.

In this case, in the step S285, the difference calculating unit 72 stays standby until the predetermined calculating time interval has elapsed after calculating the difference Z the last time and then newly calculates the difference Z. In other words, the difference calculating unit 72 calculates the difference Z in the same manner as in the step S215 and allows the procedure to proceed to a step S290. In the step S290, the threshold value determining unit 74 performs the same operation as in the step S220. Stated differently, the threshold value determining unit 74 makes a determination in order to detect whether the time-varying difference Z reaches the first threshold value K1 while increasing. If the determination made in the step S290 indicates NO, the threshold value determining unit 74 allows the procedure to proceed to a step S295.

In the step S295, the elapsed time determining unit 76 determines whether the first elapsed time TS1 is equal to or less than the upper limit of the specified elapsed time range SD. If the first elapsed time TS1 is equal to or less than the upper limit of the specified elapsed time range SD (step S295: YES), the elapsed time determining unit 76 allows the procedure to go back to the step S285.

Until the first elapsed time TS1 exceeds the upper limit of the specified elapsed time range SD, the elapsed time determining unit 76, the difference calculating unit 72 and the threshold value determining unit 74 repeatedly perform the steps S285, S290, and S295. If the first elapsed time TS1 exceeds the upper limit of the specified elapsed time range SD (step S295: NO) before the difference Z increases to reach the first threshold value K1 (step S290: NO), the elapsed time determining unit 76 terminates the series of steps included in the positive-side vibration detecting procedure W1A. In this case, the number of times calculating unit 78 performs the step S210 again.

On the other hand, if the difference Z increases to reach the first threshold value K1 before the first elapsed time TS1 exceeds the upper limit of the specified elapsed time range SD (step S290: YES, step S295: YES), the elapsed time determining unit 76 allows the procedure to proceed to a step S300.

In the step S300, the elapsed time determining unit 76 determines whether the first elapsed time TS1 is equal to or greater than the lower limit of the specified elapsed time range SD. If the first elapsed time TS1 is less than the lower limit of the specified elapsed time range SD (step S300: NO), the elapsed time determining unit 76 terminates the series of steps included in the positive-side vibration detecting procedure W1A. In this case, the number of times calculating unit 78 performs the step S210 again. The determination made in the step S300 indicates NO when the temporal change of the difference Z has a cycle shorter than the cycle of the change caused by the faults in the circuits of the manipulation amount calculating unit 62 and the comprehensive control device 50.

On the other hand, if the first elapsed time TS1 is equal to or greater than the lower limit of the specified elapsed time range SD in the step S300 (step S300: YES), the elapsed time determining unit 76 allows the procedure to go back to the step S225. When performed, the steps S295 and S300 can determine whether the first elapsed time TS1 falls within the specified elapsed time range SD. The steps S295 and S300 are referred to as the elapsed time determining procedure M3A. Since the step S280 of determining is performed before the steps S295 and S300 are performed, the elapsed time determining unit 76 determines whether the first elapsed time TS1 falls within the specified elapsed time range SD provided that the difference Z becomes equal to or less than zero within a period from when the difference Z increases to reach the first threshold value K1 to when the difference Z increases to reach the first threshold value K1 the next time.

If the prohibition flag F is off when the procedure goes back to the step S225 (step S225: YES), the step S230 is performed again to start measuring the first elapsed time TS1 and the step S235 is performed to update the first number of times C1. After this, the first number of times C1 increases as the difference Z increases to reach the first threshold value K1 (step S290: YES, step S295: YES, step S300: YES) repeatedly with the specified elapsed time range SD being satisfied. If the first number of times C1 resultantly reaches or exceeds the specified number of times CD (step S240: YES), the vibration of the spoiler 12 is detected in the step S245 as described above.

The following now describes the steps of the negative-side vibration detecting procedure W1B. The negative-side vibration detecting procedure W1B is basically performed in the same manner as the positive-side vibration detecting procedure W1A. The difference is as follows. While the positive-side vibration detecting procedure W1A captures the time-varying characteristics of the difference Z observed while it is increasing, the negative-side vibration detecting procedure W1B captures the time-varying characteristics of the difference Z observed while it is decreasing. Therefore, the negative-side vibration detecting procedure W1B is only briefly mentioned.

Figure 4:
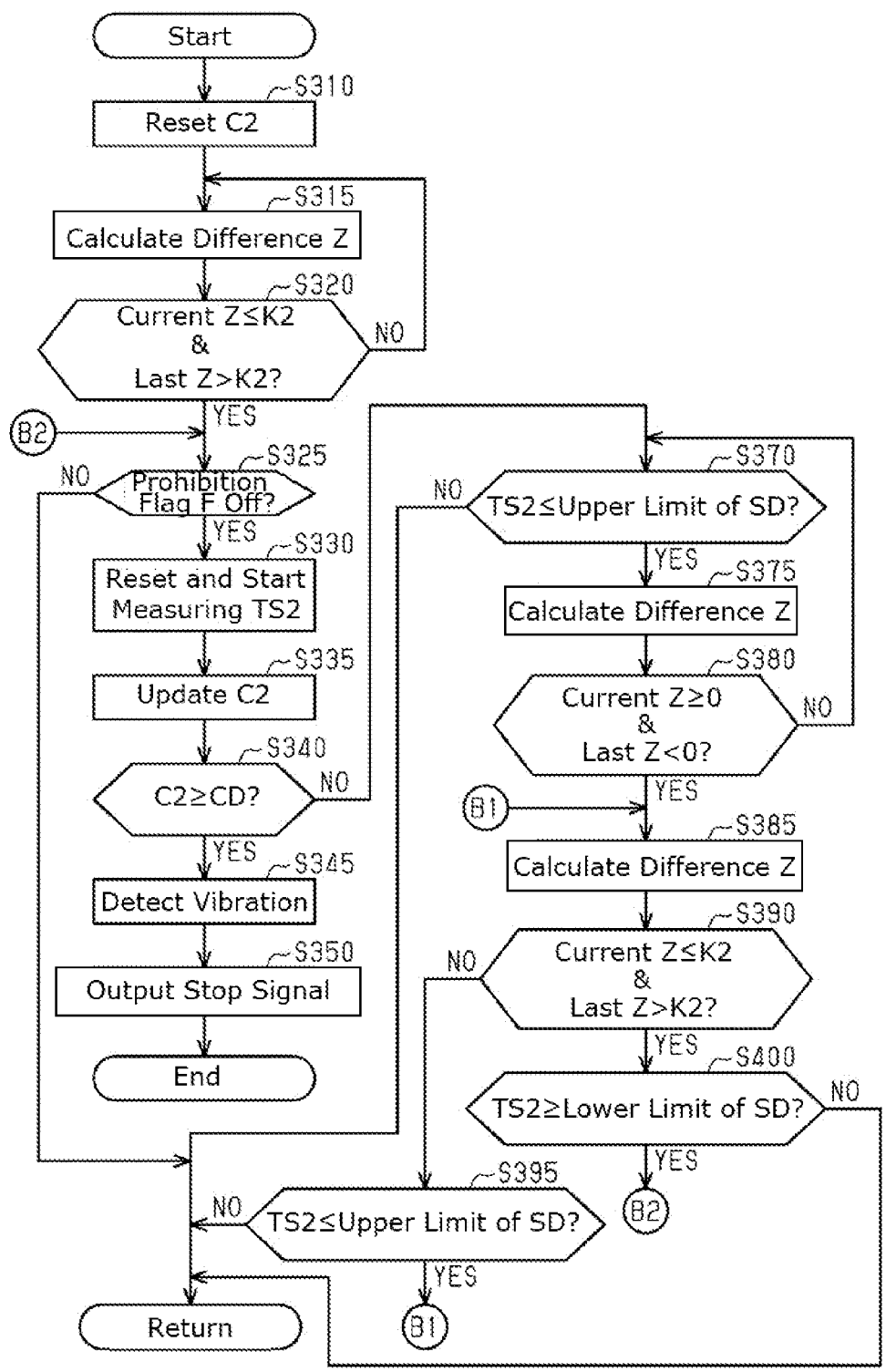
FIG. 4 is a flowchart showing steps of a negative-side vibration detecting procedure.

As shown in FIG. 4, a step S310 is first performed, where the number of times calculating unit 78 resets the second number of times C2 to zero. The step S310 is referred to as the number of times calculating procedure M4B. The step S310 is followed by a step S315, where the difference calculating unit 72 calculates the difference Z between the actual measured separation distance R1 of the rod 34 and the target separation distance R2. The step S315 is referred to as the difference calculating procedure M1. The step S315 is followed by a step S320, where the threshold value determining unit 74 determines whether the current value of the difference Z is equal to or less than the second threshold value K2 and the last value of the difference Z is greater than the second threshold value K2. If the last value of the difference Z is greater than the second threshold value K2 and the current value of the difference Z is equal to or less than the second threshold value K2, this means that the time-varying difference Z reaches the second threshold value K2 while decreasing. In other words, the determination to be made in the step S320 is designed to detect whether the difference Z has decreased to reach the second threshold value K2. The threshold value determining unit 74 monitors the temporal change of the difference Z and stays standby until the difference Z decreases to reach the second threshold value K2. If the difference Z decreases to reach the second threshold value K2 (step S320: YES), the threshold value determining unit 74 allows the procedure to proceed to a step S325. The step S320 is referred to as the second threshold value determining procedure M2B.

In the step S325, the number of times calculating unit 78 determines whether the prohibition flag F is on or off. If the prohibition flag F is on (step S325: NO), the number of times calculating unit 78 terminates the series of steps included in the negative-side vibration detecting procedure W1B. If the prohibition flag F is off (step S325: YES), the number of times calculating unit 78 allows the procedure to proceed to the step S330. In the step S330, the elapsed time determining unit 76 resets the second elapsed time TS2 and then starts measuring the second elapsed time TS2.

Subsequently in a step S335, the number of times calculating unit 78 updates the second number of times C2. The step S335 is referred to as the number of times calculating procedure M4B. In the following step S340, the vibration determining unit 82 determines whether the second number of times C2 is equal to or greater than the specified number of times CD. If the second number of times C2 is equal to or greater than the specified number of times CD (step S340: YES), the vibration determining unit 82 allows the procedure to proceed to the step S345 and determines that the spoiler 12 is vibrating. If the vibration determining unit 82 detects that the spoiler 12 is vibrating, the stop signal outputting unit 84 outputs the disconnection signal Q in the step S350. The steps S340 and S345 are referred to as the vibration determining procedure M5B. The step S350 is referred to as the stop signal outputting procedure M6.

On the other hand, if the second number of times C2 is less than the specified number of times CD in the step S340 (step S340: NO), the vibration determining unit 82 allows the procedure to proceed to a step S370. In the step S370, the elapsed time determining unit 76 determines whether the second elapsed time TS2 is equal to or less than the upper limit of the specified elapsed time range SD. If the second elapsed time TS2 is equal to or less than the upper limit of the specified elapsed time range SD (step S370: YES), the elapsed time determining unit 76 allows the procedure to proceed to a step S375.

In the step S375, the difference calculating unit 72 calculates the difference Z. After this, in a step S380, the threshold value determining unit 74 determines whether the current value of the difference Z is equal to or greater than zero and the last value of the difference Z is less than zero. If the last value of the difference Z is less than zero and the current value of the difference Z is equal to or greater than zero, this means that the time-varying difference Z reaches zero while increasing. This determination is intended to make sure that the difference Z increases to a value equal to or greater than zero within a period from when the difference Z is determined to be equal to or less than the second threshold value K2 to when the difference Z is determined to be equal to or less than the second threshold value K2 the next time. If the determination made in the step S380 indicates NO, the threshold value determining unit 74 allows the procedure to go back to the step S370.

Until the second elapsed time TS2 exceeds the upper limit of the specified elapsed time range SD, the elapsed time determining unit 76, the difference calculating unit 72 and the threshold value determining unit 74 repeatedly perform the steps S370, S375, and S380. If the second elapsed time TS2 exceeds the upper limit of the specified elapsed time range SD (step S370: NO) before the difference Z increases to reach zero (step S380: NO), the elapsed time determining unit 76 terminates the series of steps included in the negative-side vibration detecting procedure W1B. In this case, the number of times calculating unit 78 performs the step S310 again.

On the other hand, if the difference Z increases to reach zero before the second elapsed time TS2 exceeds the upper limit of the specified elapsed time range SD in the step S380 (step S370: YES, step S380: YES), the threshold value determining unit 74 allows the procedure to proceed to a step S385.

In the following step S385, the difference calculating unit 72 calculates the difference Z. In the subsequent step S390, the threshold value determining unit 74 performs the same operation as in the step S320 to determine whether the difference Z decreases to reach the second threshold value K2. If the determination made in the step 390 indicates NO, the threshold value determining unit 74 allows the procedure to proceed to a step S395.

In the step S395, the elapsed time determining unit 76 determines whether the second elapsed time TS2 is equal to or less than the upper limit of the specified elapsed time range SD. If the second elapsed time TS2 is equal to or less than the upper limit of the specified elapsed time range SD (step S395: YES), the elapsed time determining unit 76 allows the procedure to go back to the step S385.

Until the second elapsed time TS2 exceeds the upper limit of the specified elapsed time range SD, the elapsed time determining unit 76, the difference calculating unit 72 and the threshold value determining unit 74 repeatedly perform the steps S385, S390, and S395. If the second elapsed time TS2 exceeds the upper limit of the specified elapsed time range SD (step S395: NO) before the difference Z decreases to reach the second threshold value K2 (step S390: NO), the elapsed time determining unit 76 terminates the series of steps included in the negative-side vibration detecting procedure W1B.

On the other hand, if the difference Z decreases to reach the second threshold value K2 before the second elapsed time TS2 exceeds the upper limit of the specified elapsed time range SD (step S390: YES, step S395: YES), the elapsed time determining unit 76 allows the procedure to proceed to a step S400. In the step S400, the elapsed time determining unit 76 determines whether the second elapsed time TS2 is equal to or greater than the lower limit of the specified elapsed time range SD. If the second elapsed time TS2 is less than the lower limit of the specified elapsed time range SD (step S400: NO), the elapsed time determining unit 76 terminates the series of steps included in the negative-side vibration detecting procedure W1B. On the other hand, if the second elapsed time TS2 is equal to or greater than the lower limit of the specified elapsed time range SD in the step S400 (step S400: YES), the elapsed time determining unit 76 allows the procedure to go back to the step S325. The steps S395 and S400 are referred to as the elapsed time determining procedure M3B.

The following describes the effects of the present embodiment.

(1) Causes of Vibration of Spoiler 12

(1-a) Faults in Circuit of Manipulation Amount Calculating Unit 62

If faults occur in the circuit of the manipulation amount calculating unit 62, the manipulation amount calculating unit 62 may calculate the manipulation amount R3 of the rod 34 with a larger gain than should be. As the gain increases, the calculated manipulation amount R3 of the rod 34 is amplified. In this case, for example, while the target separation distance R2 of the rod 34 remains constant, the actual measured separation distance R1 may repeatedly exceed and fall below the target separation distance R2. This situation is specifically described. The actual measured separation distance R1 is compared against the target separation distance R2 to calculate the manipulation amount R3 of the rod 34. If the actual measured separation distance R1 is greater than the target separation distance R2, the manipulation amount R3 of the rod 34 is determined such that the actual measured separation distance R1 is decreased to become equal to the target separation distance R2. If an amplified manipulation amount R3 is calculated due to an inappropriate gain, however, the rod 34 is moved beyond the position satisfying the target separation distance R2. Stated differently, since the actuator 30 is controlled with the amplified manipulation amount R3, the actual measured separation distance R1 becomes less than the target separation distance R2.

If the actual measured separation distance R1 becomes less than the target separation distance R2, the manipulation amount R3 of the rod 34 is calculated such that the actual measured separation distance R1 is increased to become equal to the target separation distance R2. If an amplified manipulation amount R3 is calculated due to an inappropriate gain, however, the rod 34 is moved beyond the position satisfying the target separation distance R2. Stated differently, since the actuator 30 is controlled with the amplified manipulation amount R3, the actual measured separation distance R1 exceeds the target separation distance R2. Since the rod 34 is repeatedly controlled in this way, the actual measured separation distance R1 may repeatedly exceed and fall below the target separation distance R2. As a result, the spoiler 12 vibrates. In addition, as the actual measured separation distance R1 exceeds and falls below the target separation distance R2, the difference Z between the actual measured separation distance R1 and the target separation distance R2 shows a temporal change that increases and decreases across zero, as shown in FIG. 5.

(1-b) Faults in Circuit of Comprehensive Control Device 50

Due to the faults in the circuit of the comprehensive control device 50, the target angle P2 of the spoiler 12 itself may repeatedly increase and decrease. If such is the case, the target separation distance R2 of the rod 34 repeatedly increases and decreases. This in turn causes the actual measured separation distance R1 to repeatedly increase and decrease. As a result, the spoiler 12 vibrates. In this case, the difference Z between the actual measured separation distance R1 and the target separation distance R2 similarly shows a temporal change that increases and decreases across zero. This is because the actual measured separation distance R1 used to calculate the difference Z essentially depends on the last value of the target separation distance R2 that immediately precedes the current value of the target separation distance R2. For example, a case is assumed where the current value of the target separation distance R2 is greater than the last value of the target separation distance R2. Here, since the actual measured separation distance R1 is determined by the last value of the target separation distance R2, the actual measured separation distance R1 is less than the current value of the target separation distance R2. This means that the difference Z is a negative value. On the other hand, if the current value of the target separation distance R2 is less than the last value of the target separation distance R2, the difference Z is a positive value. Accordingly, if the target separation distance R2 repeatedly increases and decreases, the difference Z also repeatedly increases and decreases.

(2) Detection of Vibration of Spoiler 12 Through Vibration Detecting Procedure W1

(2-a) Example Case where the Spoiler 12 is Vibrating Due to Faults in Various Circuits The following first describes a first example case where the spoiler 12 is continuously vibrating due to the faults in the circuits of the manipulation amount calculating unit 62 and the comprehensive control device 50.

In the positive-side vibration detecting procedure W1A, if the difference Z reaches the first threshold value K1 while increasing at a timing A1 (step S220: YES), the first number of times C1 is set to 1 (step S235), as shown in FIG. 5. After this, if the difference Z again reaches the first threshold value K1 while increasing (step S290: YES) at a timing A2 following the timing A1 with a time interval equal to or greater than the lower limit of the specified elapsed time range SD and less than the upper limit being provided therebetween (step S295: YES, step S300: YES), the first number of times C1 is set to two (step S235). Subsequently, the difference Z similarly and repeatedly increases to reach the first threshold value K1 within a time interval satisfying the specified elapsed time range SD, so that the first number of times C1 increases. If the difference Z increases to reach the first threshold value K1 at a timing A3 following the timing A2 and the first number of times C1 reaches the specified number of times CD (step S240: YES), it is determined that the spoiler 12 is vibrating (step S245). As a result of this, the actuator connection switch 63 is switched to the disconnected state. In the negative-side vibration detecting procedure W1B, the second number of times C2 increases every time the difference Z reaches the second threshold value K2 while decreasing, as in the positive-side vibration detecting procedure W1A.

(2-b) Example Case where the Vibration of the Spoiler 12 does not Last and Settles.

The following describes a second example case where the vibration of the spoiler 12 does not last and settles.

Figure 6:
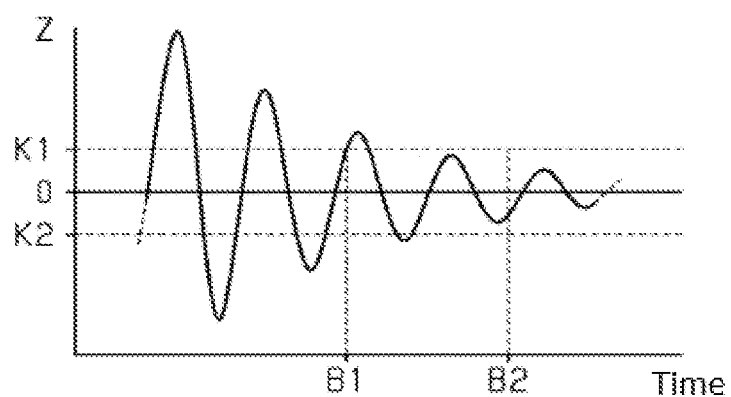
FIG. 6 is a time chart showing, as an example, how a difference varies over time.

It is assumed that, as shown in FIG. 6, the difference Z repeatedly increases to reach the first threshold value K1 within a time interval satisfying the specified elapsed time range SD, so that the first number of times C1 reaches a certain number of times CN less than the specified number of times CD at a timing B1. In the second example case, the difference Z has not reached the first threshold value K1 while increasing by a timing B2 following the timing B1 or before the allowable longest time within the specified elapsed time range SD elapses after the timing B1. If such is the case, the difference Z is not determined to have reached the first threshold value K1 in the step S290 (step S290: NO) and the first elapsed time TS1 measured after the timing B1 exceeds the upper limit (step S295: NO). Accordingly, the positive-side vibration detecting procedure W1A is terminated, and the first number of times C1 is reset (step S210). In the negative-side vibration detecting procedure W1B, the second number of times C2 is also reset before reaching the specified number of times CD.

Advantageous effects of the present embodiment will be now described.

(1) The fact that the spoiler 12 is vibrating corresponds to the fact the actual measured separation distance R1 repeatedly exceeds and falls below the target separation distance R2. In view of this, the first and second threshold values K1 and K2 are set and it is detected whether the difference Z becomes equal to or greater than the first threshold value K1 or becomes equal to or less than the second threshold value K2. This results in detecting whether the spoiler 12 is vibrating.

(2) If the spoiler 12 vibrates due to the faults in the circuits of the manipulation amount calculating unit 62 and the comprehensive control device 50, the vibration occurs according to a specific time scale. This time scale is equivalent to the specified elapsed time range SD, and the change of the difference Z within the specified elapsed time range SD is identified. In this way, the vibration can be detected only if the spoiler 12 vibrates due to the faults in the circuits. This can avoid the case where the vibration is unnecessarily detected when the spoiler 12 is operating without the faults in the circuits.

(3) If the vibration of the spoiler 12 is detected, the actuator 30 is stopped to suspend the use of the spoiler 12. The difference Z may accidentally increase and decrease even when no faults occur in the circuits of the manipulation amount calculating unit 62 and the comprehensive control device 50. If such accidental increase and decrease in the difference Z is considered to be indicative of the occurrence of vibration in the spoiler 12 and a determination is made indicating the occurrence of vibration, the use of the spoiler 12 is suspended in spite of no faults in the circuits.

To address this issue, the first and second numbers of times C1 and C2 are counted, so that a determination can be made indicating the spoiler 12 is vibrating only when it is confirmed that the difference Z continuously varies. Accordingly, accidental changes of the difference Z are not considered to be indicative of the occurrence of vibration. This can avoid the case where the use of the spoiler 12 is suspended in spite of no faults in the circuits.

(4) The spoiler 12 may be deliberately controlled to vibrate by manipulating the yoke 17. If such deliberately caused vibration is also considered to be indicative of the occurrence of vibration, the use of the spoiler 12 is adversely suspended in spite of the need to use the spoiler 12.

To address this issue, if the temporal change of the target angle P2 of the spoiler 12 is determined to be caused by the manipulation of the yoke 17, the first and second numbers of times C1 and C2 are reset so that no determination is made indicating the occurrence of vibration of the spoiler 12. Accordingly, the deliberately caused vibration of the spoiler 12 is not considered to be vibration caused by the faults in the circuits and resultantly does not lead to adverse suspension of the use of the spoiler 12.

(5) When the vibration of the spoiler 12 is detected, the disconnection signal Q is output to the actuator connection switch 63. This stops the actuator 30 from driving the spoiler 12. This can accordingly prevent the spoiler 12 from continuously vibrating.

The above embodiment can be modified as described below. The above embodiment and the following modifications can be implemented in combination to the extent where they are technically consistent with each other.

As for the positive-side and negative-side vibration detecting procedures W1A and W1B, only one of them may be carried out and the other may be skipped. In other words, only either one of the temporal change characteristics of the difference Z observed while the difference Z is increasing and the temporal change characteristics of the difference Z observed while the difference Z is decreasing may be used to detect whether the spoiler 12 is vibrating.

The aircraft vibration detecting device 70 may include a duration determining unit 89 for determining whether a first duration is equal to or greater than a specified duration. During the first duration, the difference Z continues to be equal to or greater than the first threshold value K1 after having increased to reach the first threshold value K1. Provided that the first duration is equal to or greater than the specified duration, the elapsed time determining unit 76 may determine whether the first elapsed time TS1, which is measured from the start timing of the first duration, falls within the specified elapsed time range SD. The specified duration is preferably less than the lower limit of the specified elapsed time range SD, for example. The difference Z may instantaneously take a value equal to or greater than the first threshold value K1 due to noise or other factors. As described above, this modification example is configured such that the first elapsed time TS1 is subjected to the determining step provided that the first duration is equal to or greater than the specified duration. In this way, the first elapsed time TS1 is subjected to the determining step on the premise that no instantaneous change is occurring. Accordingly, an appropriate determination can be made as for the first elapsed time TS1.

In the above-described modification example, the duration determining unit 89 may determine whether a second duration is equal to or greater than the specified duration. During the second duration, the difference Z continues to be equal to or less than the second threshold value K2 after having decreased to reach the second threshold value K2. Provided that the second duration is equal to or greater than the specified duration, the elapsed time determining unit 76 may determine whether the second elapsed time TS2, which is measured from the start timing of the second duration, falls within the specified elapsed time range SD. The present modification example is configured such that the second elapsed time TS2 is subjected to the determining step provided that the second duration is equal to or greater than the specified duration. In this way, the second elapsed time TS2 is subjected to the determining step on the premise that no instantaneous change is occurring. Accordingly, an appropriate determination can be made as for the second elapsed time TS2.

According to the above embodiment, the threshold value determining unit 74 makes it a condition that the difference Z decreases to zero or less within a period from when the difference Z is determined to be equal to or greater than the first threshold value K1 to when the difference Z is determined to be equal to or greater than the first threshold value K1 the next time. This condition may be abolished. If such is the case, the duration determining unit 89 may be provided as in the above modification example, for example, to remove the influence of the noise.

As in the above modification example, the condition may be abolished that the difference Z increases to zero or greater within a period from when the difference Z is determined to be equal to or less than the second threshold value K2 to when the difference Z is determined to be equal to or less than the second threshold value K2 the next time.

The elapsed time determining unit 76 may determine whether the first elapsed time TS1 falls within the specified elapsed time range SD provided that the difference Z increases to reach the first threshold value K1, then stops increasing and starts decreasing and subsequently decreases to reach the second threshold value K2.

As in the above-described modification example, the elapsed time determining unit 76 may determine whether the second elapsed time TS2 falls within the specified elapsed time range SD provided that the difference Z decreases to reach the second threshold value K2, then stops decreasing and starts increasing and subsequently increases to reach the first threshold value K1.

Irrespective of whether the condition that the first elapsed time TS1 is within the specified elapsed time range SD is continuously satisfied, the vibration determining unit 82 may determine that the spoiler 12 is vibrating when the determination is made for the first time that the first elapsed time TS1 falls within the specified elapsed time range SD. In this case, the step of calculating the first number of times C1 performed by the number of times calculating unit 78 can be skipped. Note that, however, when the first elapsed time TS1 is determined to fall within the specified elapsed time range SD for the first time, this may merely mean that an accidental change of the difference Z is identified. Accordingly, if the vibration determining unit 82 is configured to determine that the spoiler 12 is vibrating when the determination is made for the first time that the first elapsed time TS1 falls within the specified elapsed time range SD, the circuits of the manipulation amount calculating unit 62 and the comprehensive control device 50 may be subjected to inspection to make sure that no faults have occurred, rather than outputting the stop signal immediately after the determination is made. If any faults are detected, the stop signal may be output.

As in the above modification example, the vibration determining unit 82 may determine that the spoiler 12 is vibrating when the determination is made for the first time that the second elapsed time TS2 falls within the specified elapsed time range SD.

The vibration determining unit 82 may detect whether the spoiler 12 is vibrating without referring to the first elapsed time TS1. For example, the vibration determining unit 82 may determine that the spoiler 12 is vibrating, irrespective of the length of the first elapsed time TS1, if, within a determination period J that starts when the difference Z increases to reach the first threshold value K1, the number of times the difference Z increases to reach the first threshold value K1 becomes equal to or greater than the specified number of times CD. In this case, the elapsed time determining unit 76 starts measuring the elapsed time when the difference Z increases to reach the first threshold value K1 and, when the difference Z increases to reach the first threshold value K1 the next time, continues measuring the elapsed time without resetting the measurement of the elapsed time. The elapsed time determining unit 76 then determines whether or not this elapsed time becomes equal to the determination period J. The number of times calculating unit 78 calculates the number of times the difference Z increases to reach the first threshold value K1 until the elapsed time becomes equal to the determination period J. The vibration determining unit 82 refers to the determination made by the elapsed time determining unit 76 and the result of the calculation performed by the number of times calculating unit 78 to determine whether the spoiler 12 is vibrating. In such an embodiment, the determination period J and the specified number of times CD may be suitably determined in advance such that they can reliably indicate that the spoiler 12 is vibrating. As described in this modification example, the elapsed time determining unit 76 and the number of times calculating unit 78 can effectively serve to find out whether the difference Z is changing persistently.

From the same perspective as in the above modification example, the vibration determining unit 82 may determine that the spoiler 12 is vibrating, irrespective of the length of the second elapsed time TS2, if, within a determination period J that starts when the difference Z decreases to reach the second threshold value K2, the number of times the difference Z decreases to reach the second threshold value K2 becomes equal to or greater than the specified number of times CD.

As described in the above modification example, the determination period J and the specified number of times CD used to detect whether the spoiler 12 is vibrating are not limited to those values described in the above embodiment. The determination period J and the specified number of times CD may be suitably defined such that the vibration detecting procedure can be successfully performed.

In relation to the number of times the difference Z increases to reach the first threshold value K1 within a determination period J that starts when the difference Z increases to reach the first threshold value K1, the increase that triggers the start of the determination period J may not be counted. The vibration determining unit 82 may determine that the spoiler 12 is vibrating if the number of increases made by the difference Z excluding the increase that triggers the start of the determination period J becomes equal to or greater than the specified number of times CD.

The vibration determining unit 82 may determine that the vibration of the spoiler 12 has settled if the number of times the difference Z increases to reach the first threshold value K1 does not reach the specified number of times CD within a determination period J that starts when the difference Z increases to reach the first threshold value K1. This embodiment can be implemented in the same manner as described in the above modification example. Specifically, the elapsed time determining unit 76 may continuously measure the time that elapses after the difference Z increases to reach the first threshold value K1. With this design, it can be known that the spoiler 12 may temporarily vibrate but the vibration may then settle. From the same perspective, the vibration determining unit 82 may determine that the vibration of the spoiler 12 has settled if the number of times the difference Z decreases to reach the second threshold value K2 does not reach the specified number of times CD within a determination period J that starts when the difference Z decreases to reach the second threshold value K2.

The vibration determining unit 82 may not define the determination period J as mentioned above and may determine that the spoiler 12 is vibrating if the number of times the difference Z increases to reach the first threshold value K1 reaches the specified number of times CD during the flight of the aircraft 10. In this case, the specified number of times CD may be also suitably determined in advance. From the same perspective, the vibration determining unit 82 may not define the determination period J as mentioned above and may determine that the spoiler 12 is vibrating if the number of times the difference Z decreases to reach the second threshold value K2 reaches the specified number of times CD during the flight of the aircraft 10.

Irrespective of whether the determination period J as mentioned above is defined, the vibration determining unit 82 may determine that the spoiler 12 is vibrating if the sum of the number of times the difference Z increases to reach the first threshold value K1 and the number of times the difference Z decreases to reach the second threshold value K2 reaches the specified number of times CD. In this case, the specified number of times CD may be tuned suitably. From the same perspective, the vibration determining unit 82 may determine that the vibration of the spoiler 12 has settled if the sum of the number of times the difference Z increases to reach the first threshold value K1 and the number of times the difference Z decreases to reach the second threshold value K2 does not reach the specified number of times CD.

If the difference Z increases to reach the first threshold value K1 at least once, the vibration determining unit 82 may immediately determine that the spoiler 12 is vibrating. Likewise, if the difference Z decreases to reach the second threshold value K2 at least once, the vibration determining unit 82 may immediately determine that the spoiler 12 is vibrating. In these cases, the elapsed time determining unit 76 and the number of times calculating unit 78 can be omitted.

The first and second threshold values K1 and K2 may have different absolute values. Not only the first threshold value K1 but also the second threshold value K2 may be a positive value. Alternatively, the first and second threshold values K1 and K2 may be both a negative value. However, the first threshold value K1 is larger than the second threshold value K2. The first and second threshold values K1 and K2 may be arbitrarily determined as long as they can be suitably used to detect whether the spoiler 12 is vibrating.

The difference Z does not necessarily show a temporal change across zero. The first and second threshold values K1 and K2 may depend on the range of the possible values of the difference Z.

Whether the spoiler 12 is vibrating may be detected while the first and second threshold values K1 and K2 are tuned as required in accordance with the target angle P2.

In place of the actual values of the difference Z, the absolute values of the difference Z may be used to detect whether the spoiler 12 is vibrating. When the actual values of the difference Z are used to determine whether the spoiler 12 is vibrating as described in the above embodiment, the detection of the vibration can be carried out twice in the positive-side and negative-side vibration detecting procedures W1A and W1B.

The above embodiment describes how to prevent the vibration determining unit 82 from determining that the spoiler 12 is vibrating when the piloting operation determining unit 88 determines that the temporal change of the target angle P2 results from the manipulation of the yoke 17, but the present invention is not limited to this example. For example, if the prohibition flag F is on, the positive-side and negative-side vibration detecting procedures may be discontinued.

The manner of determining whether the temporal change of the target angle P2 is caused by the manipulation of the yoke 17 is not limited to the example described in the above embodiment. For example, the number of times that the third condition is successively satisfied is calculated, and if this number of times becomes equal to or greater than a certain number of times, the prohibition flag F may be turned on.

The first and second change rates L1 and L2 may be arbitrarily determined as long as they can be suitably used to make a determination as to the manipulation of the yoke 17. For example, the first and second change rates L1 and L2 may have different absolute values.

After the first condition is satisfied, it may be determined whether the second condition is satisfied after it is confirmed that the time-varying target angle P2 has increased to reach the peak and starts decreasing. After the second condition is satisfied, it may be determined whether the first condition is satisfied after it is confirmed that the time-varying target angle P2 has decreased to reach the peak and starts increasing. Whether or not the target angle P2 has reached the peak where the target angle P2 stops increasing and starts decreasing or stops decreasing and starts increasing may be determined by, for example, detecting whether the target value change rate ΔP2 becomes zero. Note that, as used herein, the term "peak" may not refer to peaks produced by minute changes but the peaks defining the amplitude of the time-varying target angle P2. This embodiment can eliminate the influence of the noise shown in FIG. 8 and determine whether the temporal change of the target angle P2 is caused by the manipulation of the yoke 17.

It is not essential to determine whether the temporal change of the target angle P2 is caused by the manipulation of the yoke 17. If this determining step is skipped, the specified elapsed time range SD may be tuned as appropriate, for example. In this way, the change of the difference Z while the yoke 17 is being manipulated can be excluded in detecting whether the spoiler 12 is vibrating.

The difference calculating unit 72 may calculate the difference Z by subtracting the actual measured separation distance R1 of the rod 34 from the target separation distance R2.

The difference calculating unit 72 may calculate the difference Z between the actual measured value of the angle of the spoiler 12 and the target value. In this case, for example, a sensor may be provided on the rotation shaft 14 of the spoiler 12 for measuring the rotational position. In this way, the actual measured value of the angle of the spoiler 12 may be obtained. In addition, the first and second threshold values K1 and K2 may be replaced with values corresponding to the angle of the spoiler 12.

The reference position used to determine the position of the rod 34 relative to the cylinder 32 is not limited to the example mentioned in the above embodiment. The reference position may be the center of the cylinder 32 in the central axis direction, for example.

The actuator 30 is not limited to the electrohydraulic actuator. The actuator 30 may be an electromechanical actuator having a rod to be driven by a motor.

The moving surface to be subjected to the vibration detecting procedure is not limited to the spoiler 12. The moving surface to be subjected to the vibration detecting procedure may be alternatively a flap, for example.

The stop signal is not limited to the disconnection signal Q. Any signal is acceptable as long as it can stop the actuator from driving the moving surface. For example, when the moving surface to be subjected to the vibration detecting procedure is a flap and the actuator designed to drive the flap is an electrohydraulic actuator, the stop signal may be configured to cause the hydraulic circuit to enter a fluid circuit mode where the hydraulic fluid can freely move between the halves of the fluid chamber 32A in the cylinder 32. In the fluid circuit mode, the actuator follows the movement of the flap and passively moves.

It is not essential to output the stop signal when it is detected that the object to be subjected to the vibration detecting procedure is vibrating. The pilot may take appropriate measures to deal with the situation in response to the detection of the vibration.

The aircraft vibration detecting device 70 may be configured as a separate control device from the actuator control device 60. In this case, the aircraft vibration detecting device 70 may be formed of one or more processors that perform various processes in accordance with computer programs (software). The procedures performed by the aircraft vibration detecting device 70 or the processors include the aircraft vibration detecting method described above. Alternatively, the aircraft vibration detecting device 70 may be formed of one or more dedicated hardware circuits such as application-specific integrated circuits (ASICs) that perform at least a part of the various processes, or it may be formed of circuitry including a combination of such circuits. The processors include a CPU and a memory, such as a RAM or ROM. The memory stores program codes or instructions configured to cause the CPU to perform processes. The memory, or a computer-readable storage medium, encompasses any kind of available media accessible via a general-purpose or dedicated computer. The programs stored in the computer-readable storage medium include the aircraft vibration detecting program described above.

The aircraft vibration detecting device 70 may constitute part of the comprehensive control device 50.

The functional units constituting the aircraft vibration detecting device 70 may be distributed among separate control devices. As long as these separate control devices are configured to be capable of exchanging signals, no problems will emerge for performing the positive-side and negative-side vibration detecting procedures.

The present invention encompasses the following embodiments.

Additional Embodiment 1

The aircraft vibration detecting device of claim 1, wherein the difference calculated by the difference calculating unit increases and decreases, thereby showing a temporal change, and the threshold value determining unit continuously obtains the difference calculated by the difference calculating unit and continuously determines whether the difference is equal to or greater than a first threshold value or whether the difference is equal to or less than a second threshold value, the first threshold value being larger than the second threshold value, the aircraft vibration detecting device further comprising an elapsed time determining unit for determining whether (i) a first elapsed time from when the difference increases to reach the first threshold value to when the difference increases to reach the first threshold value the next time or (ii) a second elapsed time from when the difference decreases to reach the second threshold value to when the difference decreases to reach the second threshold value the next time falls within a specified elapsed time range, and wherein the vibration determining unit determines that the moving surface is vibrating if the first elapsed time falls within the specified elapsed time range or the second elapsed time falls within the specified elapsed time range.

Additional Embodiment 2

The aircraft vibration detecting device of Additional Embodiment 1, further comprising
a duration determining unit for determining whether (i) a first duration during which the difference continues to be equal to or greater than the first threshold value after having increased to reach the first threshold value or (ii) a second duration during which the difference continues to be equal to or less than the second threshold value after having decreased to reach the second threshold value is equal to or greater than a specified duration, and
wherein the elapsed time determining unit determines whether the first elapsed time measured from a start timing of the first duration falls within the specified elapsed time range if the first duration is equal to or greater than the specified duration, and determines whether the second elapsed time measured from a start timing of the second duration falls within the specified elapsed time range if the second duration is equal to or greater than the specified duration.

Additional Embodiment 3

The aircraft vibration detecting device of Additional Embodiment 1 or 2, further comprising
a number of times calculating unit for calculating (i) a first number of times that the difference is determined to increase to reach the first threshold value within a period for which a condition of the first elapsed time being within the specified elapsed time range is continuously satisfied or (ii) a second number of times that the difference is determined to decrease to reach the second threshold value within a period for which a condition of the second elapsed time being within the specified elapsed time range is continuously satisfied,
wherein the vibration determining unit determines that the moving surface is vibrating if the first or second number of times is equal to or greater than a specified number of times.

What is claimed is:

1. An aircraft vibration detecting device applicable to an aircraft having a moving surface to be driven by an actuator, the aircraft vibration detecting device comprising circuitry configured to:
    calculate a difference between a target value of an angle of the moving surface, which is output by a comprehensive control device installed in the aircraft, and an actual measured value of the angle of the moving surface;
    determine whether an absolute value of the difference is equal to or greater than a threshold value;
    calculate the number of times the absolute value of the difference exceeds the threshold value;
    measure a time that elapses after the absolute value of the difference exceeds the threshold value;
    only when the absolute value of the difference has increased to reach the threshold value:
        determine that the moving surface is vibrating if said calculated number of times becomes equal to or greater than a specified number of times while the elapsed time is within a determination period; and
        determine that the vibration of the moving surface has settled if said number of times does not reach the specified number of times while the elapsed time is within the determination period;
    output a stop signal when it is determined that the moving surface is vibrating; and
    control the actuator, based on the stop signal, by preventing the actuator from driving the moving surface.

2. The aircraft vibration detecting device of claim 1, wherein the circuitry is further configured to determine whether a temporal change of the target value is caused by manipulation of a yoke of the aircraft, and
    wherein the circuitry is configured not to determine that the moving surface is vibrating if the temporal change of the target value is caused by manipulation of the yoke.

3. An aircraft vibration detecting method applicable to an aircraft having a moving surface to be driven by an actuator, the aircraft vibration detecting method comprising:
    calculating a difference between a target value of an angle of the moving surface, which is output by a comprehensive control device installed in the aircraft, and an actual measured value of the angle of the moving surface;
    determining whether an absolute value of the difference is equal to or greater than a threshold value;

calculating the number of times the absolute value of the difference exceeds the threshold value;

measuring a time that elapses after the absolute value of the difference exceeds the threshold value;

only when the absolute value of the difference has increased to reach the threshold value:

determining that the moving surface is vibrating if said number of times calculated becomes equal to or greater than a specified number of times while the elapsed time is within a determination period; and determining that the vibration of the moving surface has settled if said number of times calculated does not reach the specified number of times while the elapsed time is within the determination period;

outputting a stop signal when the moving surface is determined to be vibrating; and controlling the actuator, based on the stop signal, by preventing the actuator from driving the moving surface.

4. A non-transitory computer-readable storage medium storing thereon a program for aircraft vibration detection, the program being applicable to an aircraft having a moving surface to be driven by an actuator and causing a computer to perform the steps of:

calculating a difference between a target value of an angle of the moving surface, which is output by a comprehensive control device installed in the aircraft, and an actual measured value of the angle of the moving surface;

determining whether an absolute value of the difference is equal to or greater than a threshold value;

calculating the number of times the absolute value of the difference exceeds the threshold value;

measuring a time that elapses after the absolute value of the difference exceeds the threshold value;

only when the absolute value of the difference has increased to reach the threshold value:

determining that the moving surface is vibrating if said number of times calculated becomes equal to or greater than a specified number of times while the elapsed time within a determination period;

determining that the vibration of the moving surface has settled if said number of times calculated does not reach the specified number of times while the elapsed time is within the determination period;

outputting a stop signal when the moving surface is determined to be vibrating; and controlling the actuator, based on the stop signal, by preventing the actuator from driving the moving surface.

\* \* \* \* \*